United States Patent
Cowburn et al.

(10) Patent No.: US 12,033,253 B2
(45) Date of Patent: Jul. 9, 2024

(54) AUGMENTED REALITY TYPOGRAPHY PERSONALIZATION SYSTEM

(71) Applicant: Snap Inc., Santa Monica, CA (US)

(72) Inventors: Piers Cowburn, London (GB); Qi Pan, London (GB); Eitan Pilipski, Los Angeles, CA (US)

(73) Assignee: SNAP INC., Sant Monica, CA (US)

( * ) Notice: Subject to any disclaimer, the term of this patent is extended or adjusted under 35 U.S.C. 154(b) by 9 days.

(21) Appl. No.: 17/528,981

(22) Filed: Nov. 17, 2021

(65) Prior Publication Data

US 2022/0076017 A1 Mar. 10, 2022

Related U.S. Application Data

(63) Continuation of application No. 16/433,793, filed on Jun. 6, 2019, now Pat. No. 11,195,018, which is a continuation of application No. 15/492,089, filed on Apr. 20, 2017, now Pat. No. 10,387,730.

(51) Int. Cl.
| | |
|---|---|
| *G06K 9/00* | (2022.01) |
| *G06T 7/11* | (2017.01) |
| *G06T 11/60* | (2006.01) |
| *G06V 20/20* | (2022.01) |

(Continued)

(52) U.S. Cl.
CPC ............. *G06T 11/60* (2013.01); *G06T 7/11* (2017.01); *G06V 20/20* (2022.01); *G06V 20/63* (2022.01); *G06V 30/10* (2022.01)

(58) Field of Classification Search
CPC ... G06K 9/00671; G06K 2209/01; G06T 7/11
See application file for complete search history.

(56) References Cited

U.S. PATENT DOCUMENTS

| | | |
|---|---|---|
| 666,223 A | 1/1901 | Shedlock |
| 4,581,634 A | 4/1986 | Williams |
| 4,975,690 A | 12/1990 | Torres |
| (Continued) | | |

FOREIGN PATENT DOCUMENTS

| | | |
|---|---|---|
| CA | 2887596 A1 | 7/2015 |
| CN | 101893935 A | 11/2010 |
| (Continued) | | |

OTHER PUBLICATIONS

Traffic sign Detection—Neural Network, Md. Abdul Alim Sheikh et al., IEEE, 2016, pp. 307-311 (Year: 2016).*

(Continued)

*Primary Examiner* — Jayesh A Patel
(74) *Attorney, Agent, or Firm* — SCHWEGMAN LUNDBERG & WOESSNER, P.A.

(57) ABSTRACT

Disclosed are augmented reality (AR) personalization systems to enable a user to edit and personalize presentations of real-world typography in real-time. The AR personalization system captures an image depicting a physical location via a camera coupled to a client device. For example, the client device may include a mobile device that includes a camera configured to record and display images (e.g., photos, videos) in real-time. The AR personalization system causes display of the image at the client device, and scans the image to detect occurrences of typography within the image (e.g., signs, billboards, posters, graffiti).

20 Claims, 11 Drawing Sheets

(51) Int. Cl.
*G06V 20/62* (2022.01)
*G06V 30/10* (2022.01)

(56) References Cited

U.S. PATENT DOCUMENTS

| | | | |
|---|---|---|---|
| 5,072,412 A | 12/1991 | Henderson, Jr. et al. | |
| 5,361,205 A | 11/1994 | Nishino et al. | |
| 5,493,692 A | 2/1996 | Theimer et al. | |
| 5,699,444 A | 12/1997 | Palm | |
| 5,713,073 A | 1/1998 | Warsta | |
| 5,754,939 A | 5/1998 | Herz et al. | |
| 5,757,383 A * | 5/1998 | Lipton | G06F 40/166 |
| | | | 345/442 |
| 5,855,008 A | 12/1998 | Goldhaber et al. | |
| 5,883,639 A | 3/1999 | Walton et al. | |
| 5,999,932 A | 12/1999 | Paul | |
| 6,009,190 A | 12/1999 | Szeliski et al. | |
| 6,012,098 A | 1/2000 | Bayeh et al. | |
| 6,014,090 A | 1/2000 | Rosen et al. | |
| 6,029,141 A | 2/2000 | Bezos et al. | |
| 6,038,295 A | 3/2000 | Mattes | |
| 6,049,711 A | 4/2000 | Yehezkel et al. | |
| 6,154,764 A | 11/2000 | Nitta et al. | |
| 6,158,044 A | 12/2000 | Tibbetts | |
| 6,167,435 A | 12/2000 | Druckenmiller et al. | |
| 6,204,840 B1 | 3/2001 | Petelycky et al. | |
| 6,205,432 B1 | 3/2001 | Gabbard et al. | |
| 6,216,141 B1 | 4/2001 | Straub et al. | |
| 6,285,381 B1 | 9/2001 | Sawano et al. | |
| 6,285,987 B1 | 9/2001 | Roth et al. | |
| 6,310,694 B1 | 10/2001 | Okimoto et al. | |
| 6,317,789 B1 | 11/2001 | Rakavy et al. | |
| 6,334,149 B1 | 12/2001 | Davis, Jr. et al. | |
| 6,349,203 B1 | 2/2002 | Asaoka et al. | |
| 6,353,170 B1 | 3/2002 | Eyzaguirre et al. | |
| 6,446,004 B1 | 9/2002 | Cao et al. | |
| 6,449,657 B2 | 9/2002 | Stanbach et al. | |
| 6,456,852 B2 | 9/2002 | Bar et al. | |
| 6,484,196 B1 | 11/2002 | Maurille | |
| 6,487,586 B2 | 11/2002 | Ogilvie et al. | |
| 6,487,601 B1 | 11/2002 | Hubacher et al. | |
| 6,523,008 B1 | 2/2003 | Avrunin | |
| 6,525,731 B1 | 2/2003 | Suits et al. | |
| 6,542,749 B2 | 4/2003 | Tanaka et al. | |
| 6,549,768 B1 | 4/2003 | Fraccaroli | |
| 6,618,593 B1 | 9/2003 | Drutman et al. | |
| 6,622,174 B1 | 9/2003 | Ukita et al. | |
| 6,631,463 B1 | 10/2003 | Floyd et al. | |
| 6,636,247 B1 | 10/2003 | Hamzy et al. | |
| 6,636,855 B2 | 10/2003 | Holloway et al. | |
| 6,643,684 B1 | 11/2003 | Malkin et al. | |
| 6,658,095 B1 | 12/2003 | Yoakum et al. | |
| 6,665,531 B1 | 12/2003 | Soderbacka et al. | |
| 6,668,173 B2 | 12/2003 | Greene | |
| 6,684,238 B1 | 1/2004 | Dutta | |
| 6,684,257 B1 | 1/2004 | Camut et al. | |
| 6,698,020 B1 | 2/2004 | Zigmond et al. | |
| 6,700,506 B1 | 3/2004 | Winkler | |
| 6,701,347 B1 | 3/2004 | Ogilvie | |
| 6,711,608 B1 | 3/2004 | Ogilvie | |
| 6,720,860 B1 | 4/2004 | Narayanaswami | |
| 6,724,403 B1 | 4/2004 | Santoro et al. | |
| 6,757,713 B1 | 6/2004 | Ogilvie et al. | |
| 6,832,222 B1 | 12/2004 | Zimowski | |
| 6,834,195 B2 | 12/2004 | Brandenberg et al. | |
| 6,836,792 B1 | 12/2004 | Chen | |
| 6,898,626 B2 | 5/2005 | Ohashi | |
| 6,959,324 B1 | 10/2005 | Kubik et al. | |
| 6,970,088 B2 | 11/2005 | Kovach | |
| 6,970,907 B1 | 11/2005 | Ullmann et al. | |
| 6,980,909 B2 | 12/2005 | Root et al. | |
| 6,981,040 B1 | 12/2005 | Konig et al. | |
| 7,020,494 B2 | 3/2006 | Spriestersbach et al. | |
| 7,027,124 B2 | 4/2006 | Foote et al. | |
| 7,072,963 B2 | 7/2006 | Anderson et al. | |
| 7,085,571 B2 | 8/2006 | Kalhan et al. | |
| 7,110,744 B2 | 9/2006 | Freeny, Jr. | |
| 7,124,164 B1 | 10/2006 | Chemtob | |
| 7,149,893 B1 | 12/2006 | Leonard et al. | |
| 7,173,651 B1 | 2/2007 | Knowles | |
| 7,188,143 B2 | 3/2007 | Szeto | |
| 7,203,380 B2 | 4/2007 | Chiu et al. | |
| 7,206,568 B2 | 4/2007 | Sudit | |
| 7,227,937 B1 | 6/2007 | Yoakum et al. | |
| 7,237,002 B1 | 6/2007 | Estrada et al. | |
| 7,240,089 B2 | 7/2007 | Boudreau | |
| 7,243,163 B1 | 7/2007 | Friend et al. | |
| 7,269,426 B2 | 9/2007 | Kokkonen et al. | |
| 7,278,168 B1 | 10/2007 | Chaudhury et al. | |
| 7,280,658 B2 | 10/2007 | Amini et al. | |
| 7,315,823 B2 | 1/2008 | Brondrup | |
| 7,349,768 B2 | 3/2008 | Bruce et al. | |
| 7,356,564 B2 | 4/2008 | Hartselle et al. | |
| 7,376,715 B2 | 5/2008 | Cunningham et al. | |
| 7,394,345 B1 | 7/2008 | Ehlinger et al. | |
| 7,411,493 B2 | 8/2008 | Smith | |
| 7,423,580 B2 | 9/2008 | Markhovsky et al. | |
| 7,454,442 B2 | 11/2008 | Cobleigh et al. | |
| 7,478,402 B2 | 1/2009 | Christensen et al. | |
| 7,496,347 B2 | 2/2009 | Puranik | |
| 7,508,419 B2 | 3/2009 | Toyama et al. | |
| 7,512,649 B2 | 3/2009 | Faybishenko et al. | |
| 7,519,670 B2 | 4/2009 | Hagale et al. | |
| 7,535,890 B2 | 5/2009 | Rojas | |
| 7,546,554 B2 | 6/2009 | Chiu et al. | |
| 7,570,273 B1 | 8/2009 | de Waal | |
| 7,607,096 B2 | 10/2009 | Oreizy et al. | |
| 7,639,943 B1 | 12/2009 | Kalajan | |
| 7,650,231 B2 | 1/2010 | Gadler | |
| 7,668,537 B2 | 2/2010 | DeVries | |
| 7,703,140 B2 | 4/2010 | Nath et al. | |
| 7,720,554 B2 | 5/2010 | Dibernardo et al. | |
| 7,737,965 B2 | 6/2010 | Alter et al. | |
| 7,770,137 B2 | 8/2010 | Forbes et al. | |
| 7,778,973 B2 | 8/2010 | Choi | |
| 7,779,444 B2 | 8/2010 | Glad | |
| 7,787,886 B2 | 8/2010 | Markhovsky et al. | |
| 7,796,946 B2 | 9/2010 | Eisenbach | |
| 7,801,954 B2 | 9/2010 | Cadiz et al. | |
| 7,856,360 B2 | 12/2010 | Kramer et al. | |
| 7,912,289 B2 * | 3/2011 | Kansal | G06V 20/62 |
| | | | 358/1.18 |
| 7,912,896 B2 | 3/2011 | Wolovitz et al. | |
| 8,001,204 B2 | 8/2011 | Burtner et al. | |
| 8,032,586 B2 | 10/2011 | Challenger et al. | |
| 8,082,255 B1 | 12/2011 | Carlson, Jr. et al. | |
| 8,090,351 B2 | 1/2012 | Klein | |
| 8,098,904 B2 | 1/2012 | Ioffe et al. | |
| 8,099,109 B2 | 1/2012 | Altman et al. | |
| 8,112,716 B2 | 2/2012 | Kobayashi | |
| 8,131,597 B2 | 3/2012 | Hudetz | |
| 8,135,166 B2 | 3/2012 | Rhoads | |
| 8,136,028 B1 | 3/2012 | Loeb et al. | |
| 8,146,001 B1 | 3/2012 | Reese | |
| 8,161,115 B2 | 4/2012 | Yamamoto | |
| 8,161,417 B1 | 4/2012 | Lee | |
| 8,170,957 B2 | 5/2012 | Richard | |
| 8,183,997 B1 | 5/2012 | Wong et al. | |
| 8,195,203 B1 | 6/2012 | Tseng | |
| 8,199,747 B2 | 6/2012 | Rojas et al. | |
| 8,208,943 B2 | 6/2012 | Petersen | |
| 8,214,443 B2 | 7/2012 | Hamburg | |
| 8,230,258 B2 | 7/2012 | Yamagami | |
| 8,234,350 B1 | 7/2012 | Gu et al. | |
| 8,238,947 B2 | 8/2012 | Lottin et al. | |
| 8,244,593 B2 | 8/2012 | Klinger et al. | |
| 8,276,092 B1 | 9/2012 | Narayanan et al. | |
| 8,279,319 B2 | 10/2012 | Date | |
| 8,280,406 B2 | 10/2012 | Ziskind et al. | |
| 8,285,199 B2 | 10/2012 | Hsu et al. | |
| 8,287,380 B2 | 10/2012 | Nguyen et al. | |
| 8,301,159 B2 | 10/2012 | Hamynen et al. | |
| 8,306,922 B1 | 11/2012 | Kunal et al. | |
| 8,312,086 B2 | 11/2012 | Velusamy et al. | |

(56) References Cited

U.S. PATENT DOCUMENTS

| | | |
|---|---|---|
| 8,312,097 B1 | 11/2012 | Siegel et al. |
| 8,326,315 B2 | 12/2012 | Phillips et al. |
| 8,326,327 B2 | 12/2012 | Hymel et al. |
| 8,332,475 B2 | 12/2012 | Rosen et al. |
| 8,352,546 B1 | 1/2013 | Dollard |
| 8,379,130 B2 | 2/2013 | Forutanpour et al. |
| 8,385,950 B1 | 2/2013 | Wagner et al. |
| 8,402,097 B2 | 3/2013 | Szeto |
| 8,405,773 B2 | 3/2013 | Hayashi et al. |
| 8,418,067 B2 | 4/2013 | Cheng et al. |
| 8,423,409 B2 | 4/2013 | Rao |
| 8,471,914 B2 | 6/2013 | Sakiyama et al. |
| 8,472,935 B1 | 6/2013 | Fujisaki |
| 8,502,903 B2 | 8/2013 | Kashitani |
| 8,503,782 B2 * | 8/2013 | Vincent ............... G06F 16/5846 382/164 |
| 8,510,383 B2 | 8/2013 | Hurley et al. |
| 8,525,825 B2 | 9/2013 | Zhu et al. |
| 8,527,345 B2 | 9/2013 | Rothschild et al. |
| 8,554,627 B2 | 10/2013 | Svendsen et al. |
| 8,560,612 B2 | 10/2013 | Kilmer et al. |
| 8,564,710 B2 | 10/2013 | Nonaka et al. |
| 8,570,907 B2 | 10/2013 | Garcia, Jr. et al. |
| 8,594,680 B2 | 11/2013 | Ledlie et al. |
| 8,601,380 B2 | 12/2013 | Vaittinen et al. |
| 8,613,089 B1 | 12/2013 | Holloway et al. |
| 8,660,358 B1 | 2/2014 | Bergboer et al. |
| 8,660,369 B2 | 2/2014 | Llano et al. |
| 8,660,793 B2 | 2/2014 | Ngo et al. |
| 8,676,623 B2 | 3/2014 | Gale et al. |
| 8,682,350 B2 | 3/2014 | Altman et al. |
| 8,712,776 B2 | 4/2014 | Bellegarda et al. |
| 8,718,333 B2 | 5/2014 | Wolf et al. |
| 8,724,622 B2 | 5/2014 | Rojas |
| 8,732,168 B2 | 5/2014 | Johnson |
| 8,744,523 B2 | 6/2014 | Fan et al. |
| 8,745,132 B2 | 6/2014 | Obradovich |
| 8,761,800 B2 | 6/2014 | Kuwahara |
| 8,761,811 B2 | 6/2014 | Alonzo |
| 8,768,876 B2 | 7/2014 | Shim et al. |
| 8,775,972 B2 | 7/2014 | Spiegel |
| 8,788,680 B1 | 7/2014 | Naik |
| 8,790,187 B2 | 7/2014 | Walker et al. |
| 8,797,415 B2 | 8/2014 | Arnold |
| 8,798,646 B1 | 8/2014 | Wang et al. |
| 8,856,349 B2 | 10/2014 | Jain et al. |
| 8,874,677 B2 | 10/2014 | Rosen et al. |
| 8,886,227 B2 | 11/2014 | Schmidt et al. |
| 8,909,679 B2 | 12/2014 | Root et al. |
| 8,909,714 B2 | 12/2014 | Agarwal et al. |
| 8,909,725 B1 | 12/2014 | Sehn |
| 8,914,752 B1 | 12/2014 | Spiegel |
| 8,933,966 B2 | 1/2015 | Oi et al. |
| 8,965,460 B1 | 2/2015 | Rao et al. |
| 8,972,174 B2 * | 3/2015 | Jeung ............... G01C 21/3602 701/420 |
| 8,972,357 B2 | 3/2015 | Shim et al. |
| 8,995,433 B2 | 3/2015 | Rojas |
| 9,015,285 B1 | 4/2015 | Ebsen et al. |
| 9,020,745 B2 | 4/2015 | Johnston et al. |
| 9,031,283 B2 | 5/2015 | Arth et al. |
| 9,040,574 B2 | 5/2015 | Wang et al. |
| 9,055,416 B2 | 6/2015 | Rosen et al. |
| 9,058,687 B2 | 6/2015 | Kruglick |
| 9,083,770 B1 | 7/2015 | Drose et al. |
| 9,092,674 B2 * | 7/2015 | Andrade ............... G06F 40/58 |
| 9,094,137 B1 | 7/2015 | Sehn et al. |
| 9,098,926 B2 | 8/2015 | Quan et al. |
| 9,100,806 B2 | 8/2015 | Rosen et al. |
| 9,100,807 B2 | 8/2015 | Rosen et al. |
| 9,113,301 B1 | 8/2015 | Spiegel et al. |
| 9,119,027 B2 | 8/2015 | Sharon et al. |
| 9,123,074 B2 | 9/2015 | Jacobs et al. |
| 9,129,432 B2 | 9/2015 | Quan et al. |
| 9,143,382 B2 | 9/2015 | Bhogal et al. |
| 9,143,681 B1 | 9/2015 | Ebsen et al. |
| 9,148,424 B1 | 9/2015 | Yang |
| 9,152,477 B1 | 10/2015 | Campbell et al. |
| 9,191,776 B2 | 11/2015 | Root et al. |
| 9,204,252 B2 | 12/2015 | Root |
| 9,225,805 B2 | 12/2015 | Kujawa et al. |
| 9,225,897 B1 | 12/2015 | Sehn et al. |
| 9,237,202 B1 | 1/2016 | Sehn |
| 9,240,074 B2 | 1/2016 | Berkovich et al. |
| 9,251,144 B2 * | 2/2016 | Du ............... G06F 3/0488 |
| 9,258,459 B2 | 2/2016 | Hartley |
| 9,264,463 B2 | 2/2016 | Rubinstein et al. |
| 9,276,886 B2 | 3/2016 | Samaranayake |
| 9,294,425 B1 | 3/2016 | Son |
| 9,317,133 B2 | 4/2016 | Korah et al. |
| 9,317,921 B2 | 4/2016 | Chao et al. |
| 9,344,606 B2 | 5/2016 | Hartley et al. |
| 9,355,123 B2 | 5/2016 | Wnuk et al. |
| 9,361,283 B2 | 6/2016 | Jones et al. |
| 9,385,983 B1 | 7/2016 | Sehn |
| 9,396,354 B1 | 7/2016 | Murphy et al. |
| 9,407,712 B1 | 8/2016 | Sehn |
| 9,407,816 B1 | 8/2016 | Sehn |
| 9,430,783 B1 | 8/2016 | Sehn |
| 9,439,041 B2 | 9/2016 | Parvizi et al. |
| 9,443,227 B2 | 9/2016 | Evans et al. |
| 9,450,907 B2 | 9/2016 | Pridmore et al. |
| 9,459,778 B2 | 10/2016 | Hogeg et al. |
| 9,465,816 B2 | 10/2016 | Johnson et al. |
| 9,477,368 B1 | 10/2016 | Filip et al. |
| 9,482,882 B1 | 11/2016 | Hanover et al. |
| 9,482,883 B1 | 11/2016 | Meisenholder |
| 9,489,661 B2 | 11/2016 | Evans et al. |
| 9,491,134 B2 | 11/2016 | Rosen et al. |
| 9,495,783 B1 | 11/2016 | Samarasekera et al. |
| 9,495,802 B2 * | 11/2016 | Komatsu ............... G06F 3/0304 |
| 9,498,720 B2 * | 11/2016 | Geisner ............... A63F 13/75 |
| 9,532,171 B2 | 12/2016 | Allen et al. |
| 9,537,811 B2 | 1/2017 | Allen et al. |
| 9,560,006 B2 | 1/2017 | Prado et al. |
| 9,628,950 B1 | 4/2017 | Noeth et al. |
| 9,652,896 B1 | 5/2017 | Jurgenson et al. |
| 9,659,244 B2 | 5/2017 | Anderton et al. |
| 9,693,191 B2 | 6/2017 | Sehn |
| 9,705,831 B2 | 7/2017 | Spiegel |
| 9,710,821 B2 | 7/2017 | Heath |
| 9,742,713 B2 | 8/2017 | Spiegel et al. |
| 9,761,045 B1 | 9/2017 | Cote et al. |
| 9,785,796 B1 | 10/2017 | Murphy et al. |
| 9,805,020 B2 | 10/2017 | Gorman et al. |
| 9,825,898 B2 | 11/2017 | Sehn |
| 9,836,890 B2 | 12/2017 | Jurgenson et al. |
| 9,854,219 B2 | 12/2017 | Sehn |
| 9,922,431 B2 | 3/2018 | Gray et al. |
| 9,961,520 B2 | 5/2018 | Brooks et al. |
| 9,965,895 B1 | 5/2018 | Gray |
| 9,984,499 B1 | 5/2018 | Jurgenson et al. |
| 10,074,381 B1 | 9/2018 | Cowburn |
| 10,074,981 B2 | 9/2018 | Faley et al. |
| 10,102,680 B2 | 10/2018 | Jurgenson et al. |
| 10,304,237 B2 | 5/2019 | Sequeira et al. |
| 10,319,149 B1 | 6/2019 | Cowburn et al. |
| 10,366,543 B1 | 7/2019 | Jurgenson et al. |
| 10,387,730 B1 | 8/2019 | Cowburn et al. |
| 10,497,158 B2 | 12/2019 | Jain et al. |
| 10,614,828 B1 | 4/2020 | Cowburn et al. |
| 10,657,596 B1 | 5/2020 | Chavez et al. |
| 10,657,708 B1 | 5/2020 | Jurgenson et al. |
| 10,733,802 B2 | 8/2020 | Jurgenson et al. |
| 10,740,974 B1 | 8/2020 | Cowburn et al. |
| 10,773,802 B2 | 9/2020 | Finlay et al. |
| 10,984,284 B1 | 4/2021 | Corcoran et al. |
| 10,997,760 B2 | 5/2021 | Berger et al. |
| 10,997,783 B2 | 5/2021 | Jurgenson et al. |
| 11,195,018 B1 | 12/2021 | Cowburn et al. |
| 11,315,331 B2 | 4/2022 | Jurgenson et al. |
| 11,769,307 B2 | 9/2023 | Jurgenson et al. |
| 2001/0056308 A1 | 12/2001 | Petrov et al. |
| 2002/0047868 A1 | 4/2002 | Miyazawa |

(56) References Cited

U.S. PATENT DOCUMENTS

| | | |
|---|---|---|
| 2002/0078456 A1 | 6/2002 | Hudson et al. |
| 2002/0087631 A1 | 7/2002 | Sharma |
| 2002/0097257 A1 | 7/2002 | Miller et al. |
| 2002/0122659 A1 | 9/2002 | Mcgrath et al. |
| 2002/0128047 A1 | 9/2002 | Gates |
| 2002/0144154 A1 | 10/2002 | Tomkow |
| 2002/0144253 A1* | 10/2002 | Kumhyr ............... G06F 8/33 717/170 |
| 2003/0001846 A1 | 1/2003 | Davis et al. |
| 2003/0016247 A1 | 1/2003 | Lai et al. |
| 2003/0017823 A1 | 1/2003 | Mager et al. |
| 2003/0020623 A1 | 1/2003 | Cao et al. |
| 2003/0023874 A1 | 1/2003 | Prokupets et al. |
| 2003/0037124 A1 | 2/2003 | Yamaura et al. |
| 2003/0040899 A1 | 2/2003 | Ogilvie |
| 2003/0050785 A1 | 3/2003 | Friedrich et al. |
| 2003/0052925 A1 | 3/2003 | Daimon et al. |
| 2003/0101044 A1 | 5/2003 | Krasnov |
| 2003/0101230 A1 | 5/2003 | Benschoter et al. |
| 2003/0110503 A1 | 6/2003 | Perkes |
| 2003/0126215 A1 | 7/2003 | Udell |
| 2003/0133041 A1 | 7/2003 | Curtis et al. |
| 2003/0148773 A1 | 8/2003 | Spriestersbach et al. |
| 2003/0164856 A1 | 9/2003 | Prager et al. |
| 2003/0217106 A1 | 11/2003 | Adar et al. |
| 2003/0229607 A1 | 12/2003 | Zellweger et al. |
| 2004/0027371 A1 | 2/2004 | Jaeger |
| 2004/0064429 A1 | 4/2004 | Hirstius et al. |
| 2004/0078367 A1 | 4/2004 | Anderson et al. |
| 2004/0095357 A1 | 5/2004 | Oh et al. |
| 2004/0111467 A1 | 6/2004 | Willis |
| 2004/0158739 A1 | 8/2004 | Wakai et al. |
| 2004/0189465 A1 | 9/2004 | Capobianco et al. |
| 2004/0203959 A1 | 10/2004 | Coombes |
| 2004/0215625 A1 | 10/2004 | Svendsen et al. |
| 2004/0243531 A1 | 12/2004 | Dean |
| 2004/0243688 A1 | 12/2004 | Wugofski |
| 2005/0021444 A1 | 1/2005 | Bauer et al. |
| 2005/0022211 A1 | 1/2005 | Veselov et al. |
| 2005/0048989 A1 | 3/2005 | Jung |
| 2005/0052339 A1 | 3/2005 | Sprague |
| 2005/0078804 A1 | 4/2005 | Yomoda |
| 2005/0097176 A1 | 5/2005 | Schatz et al. |
| 2005/0102381 A1 | 5/2005 | Jiang et al. |
| 2005/0104976 A1 | 5/2005 | Currans |
| 2005/0114783 A1 | 5/2005 | Szeto |
| 2005/0119936 A1 | 6/2005 | Buchanan et al. |
| 2005/0122405 A1 | 6/2005 | Voss et al. |
| 2005/0162523 A1 | 7/2005 | Darrell et al. |
| 2005/0193340 A1 | 9/2005 | Amburgey et al. |
| 2005/0193345 A1 | 9/2005 | Klassen et al. |
| 2005/0198128 A1 | 9/2005 | Anderson |
| 2005/0223066 A1 | 10/2005 | Buchheit et al. |
| 2005/0288954 A1 | 12/2005 | McCarthy et al. |
| 2006/0001758 A1 | 1/2006 | Nam et al. |
| 2006/0026067 A1 | 2/2006 | Nicholas et al. |
| 2006/0107297 A1 | 5/2006 | Toyama et al. |
| 2006/0114338 A1 | 6/2006 | Rothschild |
| 2006/0119882 A1 | 6/2006 | Harris et al. |
| 2006/0242239 A1 | 10/2006 | Morishima et al. |
| 2006/0252438 A1 | 11/2006 | Ansamaa et al. |
| 2006/0265417 A1 | 11/2006 | Amato et al. |
| 2006/0270419 A1 | 11/2006 | Crowley et al. |
| 2006/0287878 A1 | 12/2006 | Wadhwa et al. |
| 2007/0004426 A1 | 1/2007 | Pfleging et al. |
| 2007/0038715 A1 | 2/2007 | Collins et al. |
| 2007/0040931 A1 | 2/2007 | Nishizawa |
| 2007/0064899 A1 | 3/2007 | Boss et al. |
| 2007/0073517 A1 | 3/2007 | Panje |
| 2007/0073823 A1 | 3/2007 | Cohen et al. |
| 2007/0075898 A1 | 4/2007 | Markhovsky et al. |
| 2007/0082707 A1 | 4/2007 | Flynt et al. |
| 2007/0136228 A1 | 6/2007 | Petersen |
| 2007/0192128 A1 | 8/2007 | Celestini |
| 2007/0198340 A1 | 8/2007 | Lucovsky et al. |
| 2007/0198495 A1 | 8/2007 | Buron et al. |
| 2007/0208751 A1 | 9/2007 | Cowan et al. |
| 2007/0210936 A1 | 9/2007 | Nicholson |
| 2007/0214180 A1 | 9/2007 | Crawford |
| 2007/0214216 A1 | 9/2007 | Carrer et al. |
| 2007/0233556 A1 | 10/2007 | Koningstein |
| 2007/0233801 A1 | 10/2007 | Eren et al. |
| 2007/0233859 A1 | 10/2007 | Zhao et al. |
| 2007/0243887 A1 | 10/2007 | Bandhole et al. |
| 2007/0244750 A1 | 10/2007 | Grannan et al. |
| 2007/0255456 A1 | 11/2007 | Funayama |
| 2007/0281690 A1 | 12/2007 | Altman et al. |
| 2008/0022329 A1 | 1/2008 | Glad |
| 2008/0025701 A1 | 1/2008 | Ikeda |
| 2008/0032703 A1 | 2/2008 | Krumm et al. |
| 2008/0033930 A1 | 2/2008 | Warren |
| 2008/0043041 A2 | 2/2008 | Hedenstroem et al. |
| 2008/0049704 A1 | 2/2008 | Witteman et al. |
| 2008/0055269 A1 | 3/2008 | Lemay et al. |
| 2008/0062141 A1 | 3/2008 | Chandhri |
| 2008/0076505 A1 | 3/2008 | Ngyen et al. |
| 2008/0088623 A1 | 4/2008 | Bukowski et al. |
| 2008/0092233 A1 | 4/2008 | Tian et al. |
| 2008/0094387 A1 | 4/2008 | Chen |
| 2008/0104503 A1 | 5/2008 | Beall et al. |
| 2008/0109844 A1 | 5/2008 | Baldeschweiler et al. |
| 2008/0120409 A1 | 5/2008 | Sun et al. |
| 2008/0147730 A1 | 6/2008 | Lee et al. |
| 2008/0148150 A1 | 6/2008 | Mall |
| 2008/0158230 A1 | 7/2008 | Sharma et al. |
| 2008/0168033 A1 | 7/2008 | Ott et al. |
| 2008/0168489 A1 | 7/2008 | Schraga |
| 2008/0189177 A1 | 8/2008 | Anderton et al. |
| 2008/0207176 A1 | 8/2008 | Brackbill et al. |
| 2008/0208692 A1 | 8/2008 | Garaventi et al. |
| 2008/0214210 A1 | 9/2008 | Rasanen et al. |
| 2008/0222545 A1 | 9/2008 | Lemay |
| 2008/0255976 A1 | 10/2008 | Altberg et al. |
| 2008/0256446 A1 | 10/2008 | Yamamoto |
| 2008/0256577 A1 | 10/2008 | Funaki et al. |
| 2008/0266421 A1 | 10/2008 | Takahata et al. |
| 2008/0270938 A1 | 10/2008 | Carlson |
| 2008/0273796 A1* | 11/2008 | Kansal ............... G06V 20/62 382/176 |
| 2008/0288338 A1 | 11/2008 | Wiseman et al. |
| 2008/0306826 A1 | 12/2008 | Kramer et al. |
| 2008/0313329 A1 | 12/2008 | Wang et al. |
| 2008/0313346 A1 | 12/2008 | Kujawa et al. |
| 2008/0318616 A1 | 12/2008 | Chipalkatti et al. |
| 2009/0006191 A1 | 1/2009 | Arankalle et al. |
| 2009/0006565 A1 | 1/2009 | Velusamy et al. |
| 2009/0015703 A1 | 1/2009 | Kim et al. |
| 2009/0024956 A1 | 1/2009 | Kobayashi |
| 2009/0030774 A1 | 1/2009 | Rothschild et al. |
| 2009/0030999 A1 | 1/2009 | Gatzke et al. |
| 2009/0040324 A1 | 2/2009 | Nonaka |
| 2009/0042588 A1 | 2/2009 | Lottin et al. |
| 2009/0058822 A1 | 3/2009 | Chaudhri |
| 2009/0079846 A1 | 3/2009 | Chou |
| 2009/0089678 A1 | 4/2009 | Sacco et al. |
| 2009/0089710 A1 | 4/2009 | Wood et al. |
| 2009/0093261 A1 | 4/2009 | Ziskind |
| 2009/0132341 A1 | 5/2009 | Klinger |
| 2009/0132453 A1 | 5/2009 | Hangartner et al. |
| 2009/0132665 A1 | 5/2009 | Thomsen et al. |
| 2009/0148045 A1 | 6/2009 | Lee et al. |
| 2009/0153492 A1 | 6/2009 | Popp |
| 2009/0157450 A1 | 6/2009 | Athsani et al. |
| 2009/0157752 A1 | 6/2009 | Gonzalez |
| 2009/0160970 A1 | 6/2009 | Fredlund et al. |
| 2009/0163182 A1 | 6/2009 | Gatti et al. |
| 2009/0177299 A1 | 7/2009 | Van De Sluis |
| 2009/0192900 A1 | 7/2009 | Collision |
| 2009/0199242 A1 | 8/2009 | Johnson et al. |
| 2009/0215469 A1 | 8/2009 | Fisher et al. |
| 2009/0232354 A1* | 9/2009 | Camp, Jr. ............... G06Q 30/02 382/103 |
| 2009/0234815 A1 | 9/2009 | Boerries et al. |
| 2009/0239552 A1 | 9/2009 | Churchill et al. |

(56) References Cited

U.S. PATENT DOCUMENTS

| | | |
|---|---|---|
| 2009/0249222 A1 | 10/2009 | Schmidt et al. |
| 2009/0249244 A1 | 10/2009 | Robinson et al. |
| 2009/0265647 A1 | 10/2009 | Martin et al. |
| 2009/0288022 A1 | 11/2009 | Almstrand et al. |
| 2009/0291672 A1 | 11/2009 | Treves et al. |
| 2009/0292608 A1 | 11/2009 | Polachek |
| 2009/0293012 A1 | 11/2009 | Alter et al. |
| 2009/0319607 A1 | 12/2009 | Belz et al. |
| 2009/0327073 A1 | 12/2009 | Li |
| 2010/0062794 A1 | 3/2010 | Han |
| 2010/0082427 A1 | 4/2010 | Burgener et al. |
| 2010/0082693 A1 | 4/2010 | Hugg et al. |
| 2010/0100568 A1 | 4/2010 | Papin et al. |
| 2010/0113065 A1 | 5/2010 | Narayan et al. |
| 2010/0130233 A1 | 5/2010 | Parker |
| 2010/0131880 A1 | 5/2010 | Lee et al. |
| 2010/0131895 A1 | 5/2010 | Wohlert |
| 2010/0153144 A1 | 6/2010 | Miller et al. |
| 2010/0159944 A1 | 6/2010 | Pascal et al. |
| 2010/0161658 A1 | 6/2010 | Hamynen et al. |
| 2010/0161831 A1 | 6/2010 | Haas et al. |
| 2010/0162149 A1 | 6/2010 | Sheleheda et al. |
| 2010/0183280 A1 | 7/2010 | Beauregard et al. |
| 2010/0185552 A1 | 7/2010 | Deluca et al. |
| 2010/0185665 A1 | 7/2010 | Horn et al. |
| 2010/0191631 A1 | 7/2010 | Weidmann |
| 2010/0197318 A1 | 8/2010 | Petersen et al. |
| 2010/0197319 A1 | 8/2010 | Petersen et al. |
| 2010/0198683 A1 | 8/2010 | Aarabi |
| 2010/0198694 A1 | 8/2010 | Muthukrishnan |
| 2010/0198826 A1 | 8/2010 | Petersen et al. |
| 2010/0198828 A1 | 8/2010 | Petersen et al. |
| 2010/0198862 A1 | 8/2010 | Jennings et al. |
| 2010/0198870 A1 | 8/2010 | Petersen et al. |
| 2010/0198917 A1 | 8/2010 | Petersen et al. |
| 2010/0201482 A1 | 8/2010 | Robertson et al. |
| 2010/0201536 A1 | 8/2010 | Robertson et al. |
| 2010/0214436 A1 | 8/2010 | Kim et al. |
| 2010/0223128 A1 | 9/2010 | Dukellis et al. |
| 2010/0223343 A1 | 9/2010 | Bosan et al. |
| 2010/0250109 A1 | 9/2010 | Johnston et al. |
| 2010/0257196 A1 | 10/2010 | Waters et al. |
| 2010/0259386 A1 | 10/2010 | Holley et al. |
| 2010/0273509 A1 | 10/2010 | Sweeney et al. |
| 2010/0281045 A1 | 11/2010 | Dean |
| 2010/0287485 A1 | 11/2010 | Bertolami et al. |
| 2010/0306669 A1 | 12/2010 | Della Pasqua |
| 2010/0315418 A1 | 12/2010 | Woo |
| 2010/0316280 A1 | 12/2010 | Lancaster et al. |
| 2011/0004071 A1 | 1/2011 | Faiola et al. |
| 2011/0010205 A1 | 1/2011 | Richards |
| 2011/0029512 A1 | 2/2011 | Folgner et al. |
| 2011/0040783 A1 | 2/2011 | Uemichi et al. |
| 2011/0040804 A1 | 2/2011 | Peirce et al. |
| 2011/0050909 A1 | 3/2011 | Ellenby et al. |
| 2011/0050915 A1 | 3/2011 | Wang et al. |
| 2011/0064388 A1 | 3/2011 | Brown et al. |
| 2011/0066743 A1 | 3/2011 | Hurley et al. |
| 2011/0083101 A1 | 4/2011 | Sharon et al. |
| 2011/0090253 A1* | 4/2011 | Good .................. G06V 30/15 345/633 |
| 2011/0096093 A1 | 4/2011 | Oi et al. |
| 2011/0099507 A1 | 4/2011 | Nesladek et al. |
| 2011/0102630 A1 | 5/2011 | Rukes |
| 2011/0119133 A1 | 5/2011 | Igelman et al. |
| 2011/0137881 A1 | 6/2011 | Cheng et al. |
| 2011/0145564 A1 | 6/2011 | Moshir et al. |
| 2011/0159890 A1 | 6/2011 | Fortescue et al. |
| 2011/0164163 A1 | 7/2011 | Bilbrey et al. |
| 2011/0197194 A1 | 8/2011 | D'Angelo et al. |
| 2011/0202598 A1 | 8/2011 | Evans et al. |
| 2011/0202968 A1 | 8/2011 | Nurmi |
| 2011/0211534 A1 | 9/2011 | Schmidt et al. |
| 2011/0213845 A1 | 9/2011 | Logan et al. |
| 2011/0215966 A1 | 9/2011 | Kim et al. |
| 2011/0225048 A1 | 9/2011 | Nair |
| 2011/0238763 A1 | 9/2011 | Shin et al. |
| 2011/0255736 A1 | 10/2011 | Thompson et al. |
| 2011/0270584 A1 | 11/2011 | Plocher et al. |
| 2011/0273575 A1 | 11/2011 | Lee |
| 2011/0279446 A1 | 11/2011 | Castro et al. |
| 2011/0279453 A1 | 11/2011 | Murphy et al. |
| 2011/0282799 A1 | 11/2011 | Huston |
| 2011/0283188 A1 | 11/2011 | Farrenkopf |
| 2011/0286586 A1 | 11/2011 | Saylor et al. |
| 2011/0314419 A1 | 12/2011 | Dunn et al. |
| 2011/0320373 A1 | 12/2011 | Lee et al. |
| 2012/0028659 A1 | 2/2012 | Whitney et al. |
| 2012/0033718 A1 | 2/2012 | Kauffman et al. |
| 2012/0036015 A1 | 2/2012 | Sheikh |
| 2012/0036443 A1 | 2/2012 | Ohmori et al. |
| 2012/0041722 A1 | 2/2012 | Quan et al. |
| 2012/0054797 A1 | 3/2012 | Skog et al. |
| 2012/0059722 A1 | 3/2012 | Rao |
| 2012/0062805 A1 | 3/2012 | Candelore |
| 2012/0069233 A1 | 3/2012 | Nonaka et al. |
| 2012/0084731 A1 | 4/2012 | Filman et al. |
| 2012/0084835 A1 | 4/2012 | Thomas et al. |
| 2012/0086727 A1 | 4/2012 | Korah et al. |
| 2012/0092329 A1* | 4/2012 | Koo .................. G06V 20/63 345/419 |
| 2012/0099800 A1 | 4/2012 | Llano et al. |
| 2012/0108293 A1 | 5/2012 | Law et al. |
| 2012/0110096 A1 | 5/2012 | Smarr et al. |
| 2012/0113142 A1 | 5/2012 | Adhikari et al. |
| 2012/0113143 A1* | 5/2012 | Adhikari .............. G06Q 30/0623 345/633 |
| 2012/0113272 A1 | 5/2012 | Hata |
| 2012/0122570 A1 | 5/2012 | Baronoff |
| 2012/0123830 A1 | 5/2012 | Svendsen et al. |
| 2012/0123871 A1 | 5/2012 | Svendsen et al. |
| 2012/0123875 A1 | 5/2012 | Svendsen et al. |
| 2012/0124126 A1 | 5/2012 | Alcazar et al. |
| 2012/0124176 A1 | 5/2012 | Curtis et al. |
| 2012/0124458 A1 | 5/2012 | Cruzada |
| 2012/0131507 A1 | 5/2012 | Sparandara et al. |
| 2012/0131512 A1 | 5/2012 | Takeuchi et al. |
| 2012/0143760 A1 | 6/2012 | Abulafia et al. |
| 2012/0146991 A1 | 6/2012 | Bala et al. |
| 2012/0150978 A1 | 6/2012 | Monaco |
| 2012/0165100 A1 | 6/2012 | Lalancette et al. |
| 2012/0166971 A1 | 6/2012 | Sachson et al. |
| 2012/0169855 A1 | 7/2012 | Oh |
| 2012/0172062 A1 | 7/2012 | Altman et al. |
| 2012/0173991 A1 | 7/2012 | Roberts et al. |
| 2012/0176401 A1 | 7/2012 | Hayward et al. |
| 2012/0181330 A1 | 7/2012 | Kim |
| 2012/0184248 A1 | 7/2012 | Speede |
| 2012/0197724 A1 | 8/2012 | Kendall |
| 2012/0200743 A1 | 8/2012 | Blanchflower et al. |
| 2012/0209921 A1 | 8/2012 | Adafin et al. |
| 2012/0209924 A1 | 8/2012 | Evans et al. |
| 2012/0210244 A1 | 8/2012 | De Francisco Lopez et al. |
| 2012/0212509 A1 | 8/2012 | Benko et al. |
| 2012/0212632 A1 | 8/2012 | Mate et al. |
| 2012/0220264 A1 | 8/2012 | Kawabata |
| 2012/0226748 A1 | 9/2012 | Bosworth et al. |
| 2012/0233000 A1 | 9/2012 | Fisher et al. |
| 2012/0236162 A1 | 9/2012 | Imamura |
| 2012/0239761 A1 | 9/2012 | Linner et al. |
| 2012/0250951 A1 | 10/2012 | Chen |
| 2012/0252418 A1 | 10/2012 | Kandekar et al. |
| 2012/0254325 A1 | 10/2012 | Majeti et al. |
| 2012/0278387 A1 | 11/2012 | Garcia et al. |
| 2012/0278692 A1 | 11/2012 | Shi |
| 2012/0290637 A1 | 11/2012 | Perantatos et al. |
| 2012/0299954 A1 | 11/2012 | Wada et al. |
| 2012/0304052 A1 | 11/2012 | Tanaka et al. |
| 2012/0304080 A1 | 11/2012 | Wormald et al. |
| 2012/0307096 A1 | 12/2012 | Ford et al. |
| 2012/0307112 A1 | 12/2012 | Kunishige et al. |
| 2012/0314040 A1 | 12/2012 | Kopf et al. |
| 2012/0319904 A1 | 12/2012 | Lee et al. |
| 2012/0323933 A1 | 12/2012 | He et al. |

(56) References Cited

U.S. PATENT DOCUMENTS

| | | | |
|---|---|---|---|
| 2012/0324018 A1 | 12/2012 | Metcalf et al. | |
| 2012/0330646 A1* | 12/2012 | Andrade | G06V 20/20 704/7 |
| 2013/0002649 A1 | 1/2013 | Wu et al. | |
| 2013/0004068 A1* | 1/2013 | Koo | G06T 11/60 382/165 |
| 2013/0006759 A1 | 1/2013 | Srivastava et al. | |
| 2013/0024757 A1 | 1/2013 | Doll et al. | |
| 2013/0036364 A1 | 2/2013 | Johnson | |
| 2013/0045753 A1 | 2/2013 | Obermeyer et al. | |
| 2013/0050260 A1 | 2/2013 | Reitan | |
| 2013/0055083 A1 | 2/2013 | Fino | |
| 2013/0057587 A1 | 3/2013 | Leonard et al. | |
| 2013/0059607 A1 | 3/2013 | Herz et al. | |
| 2013/0060690 A1 | 3/2013 | Oskolkov et al. | |
| 2013/0060911 A1 | 3/2013 | Nagaraj et al. | |
| 2013/0063369 A1 | 3/2013 | Malhotra et al. | |
| 2013/0067027 A1 | 3/2013 | Song et al. | |
| 2013/0071093 A1 | 3/2013 | Hanks et al. | |
| 2013/0080254 A1 | 3/2013 | Thramann | |
| 2013/0085790 A1 | 4/2013 | Palmer et al. | |
| 2013/0086072 A1 | 4/2013 | Peng et al. | |
| 2013/0088491 A1 | 4/2013 | Hobbs et al. | |
| 2013/0090171 A1 | 4/2013 | Holton et al. | |
| 2013/0095857 A1 | 4/2013 | Garcia et al. | |
| 2013/0103383 A1* | 4/2013 | Du | G06F 40/58 704/3 |
| 2013/0104053 A1 | 4/2013 | Thornton et al. | |
| 2013/0110885 A1 | 5/2013 | Brundrett, III | |
| 2013/0111514 A1 | 5/2013 | Slavin et al. | |
| 2013/0128059 A1 | 5/2013 | Kristensson | |
| 2013/0129252 A1 | 5/2013 | Lauper | |
| 2013/0132477 A1 | 5/2013 | Bosworth et al. | |
| 2013/0141419 A1 | 6/2013 | Mount et al. | |
| 2013/0145286 A1 | 6/2013 | Feng et al. | |
| 2013/0159110 A1 | 6/2013 | Rajaram et al. | |
| 2013/0159919 A1 | 6/2013 | Leydon | |
| 2013/0169680 A1 | 7/2013 | Chien et al. | |
| 2013/0169822 A1 | 7/2013 | Zhu et al. | |
| 2013/0173729 A1 | 7/2013 | Starenky et al. | |
| 2013/0181971 A1 | 7/2013 | Mueller | |
| 2013/0182133 A1 | 7/2013 | Tanabe | |
| 2013/0185131 A1 | 7/2013 | Sinha et al. | |
| 2013/0187952 A1 | 7/2013 | Berkovich et al. | |
| 2013/0191198 A1 | 7/2013 | Carlson et al. | |
| 2013/0194164 A1 | 8/2013 | Sugden et al. | |
| 2013/0194301 A1 | 8/2013 | Robbins et al. | |
| 2013/0198176 A1 | 8/2013 | Kim | |
| 2013/0215101 A1 | 8/2013 | Duan | |
| 2013/0218965 A1 | 8/2013 | Abrol et al. | |
| 2013/0218968 A1 | 8/2013 | Mcevilly et al. | |
| 2013/0222323 A1 | 8/2013 | Mckenzie | |
| 2013/0227476 A1 | 8/2013 | Frey | |
| 2013/0232194 A1 | 9/2013 | Knapp et al. | |
| 2013/0263031 A1 | 10/2013 | Oshiro et al. | |
| 2013/0265450 A1 | 10/2013 | Barnes, Jr. | |
| 2013/0267253 A1 | 10/2013 | Case et al. | |
| 2013/0275505 A1 | 10/2013 | Gauglitz et al. | |
| 2013/0290443 A1 | 10/2013 | Collins et al. | |
| 2013/0304646 A1 | 11/2013 | De Geer | |
| 2013/0308822 A1 | 11/2013 | Marimon et al. | |
| 2013/0311255 A1 | 11/2013 | Cummins et al. | |
| 2013/0325964 A1 | 12/2013 | Berberat | |
| 2013/0332066 A1* | 12/2013 | Jeung | G01C 21/3602 701/420 |
| 2013/0344896 A1 | 12/2013 | Kirmse et al. | |
| 2013/0346869 A1 | 12/2013 | Asver et al. | |
| 2013/0346877 A1 | 12/2013 | Borovoy et al. | |
| 2014/0006129 A1 | 1/2014 | Heath | |
| 2014/0011538 A1 | 1/2014 | Mulcahy et al. | |
| 2014/0019264 A1 | 1/2014 | Wachman et al. | |
| 2014/0029798 A1 | 1/2014 | Flynn et al. | |
| 2014/0032682 A1 | 1/2014 | Prado et al. | |
| 2014/0043204 A1 | 2/2014 | Basnayake et al. | |
| 2014/0045530 A1 | 2/2014 | Gordon et al. | |
| 2014/0047016 A1 | 2/2014 | Rao | |
| 2014/0047045 A1 | 2/2014 | Baldwin et al. | |
| 2014/0047335 A1 | 2/2014 | Lewis et al. | |
| 2014/0049652 A1 | 2/2014 | Moon et al. | |
| 2014/0052485 A1 | 2/2014 | Shidfar | |
| 2014/0052633 A1 | 2/2014 | Gandhi | |
| 2014/0057660 A1 | 2/2014 | Wager | |
| 2014/0064624 A1 | 3/2014 | Kim et al. | |
| 2014/0081634 A1 | 3/2014 | Forutanpour | |
| 2014/0082651 A1 | 3/2014 | Sharifi | |
| 2014/0086727 A1 | 3/2014 | Xu | |
| 2014/0092130 A1 | 4/2014 | Anderson et al. | |
| 2014/0096029 A1 | 4/2014 | Schultz | |
| 2014/0114565 A1 | 4/2014 | Aziz et al. | |
| 2014/0122658 A1 | 5/2014 | Haeger et al. | |
| 2014/0122787 A1 | 5/2014 | Shalvi et al. | |
| 2014/0125658 A1 | 5/2014 | Bell et al. | |
| 2014/0125668 A1 | 5/2014 | Steed et al. | |
| 2014/0129207 A1 | 5/2014 | Bailey et al. | |
| 2014/0129953 A1 | 5/2014 | Spiegel | |
| 2014/0143143 A1 | 5/2014 | Fasoli et al. | |
| 2014/0149519 A1 | 5/2014 | Redfern et al. | |
| 2014/0155102 A1 | 6/2014 | Cooper et al. | |
| 2014/0173424 A1 | 6/2014 | Hogeg et al. | |
| 2014/0173457 A1 | 6/2014 | Wang et al. | |
| 2014/0189592 A1 | 7/2014 | Benchenaa et al. | |
| 2014/0201527 A1 | 7/2014 | Krivorot | |
| 2014/0207679 A1 | 7/2014 | Cho | |
| 2014/0214471 A1 | 7/2014 | Schreiner, III | |
| 2014/0222564 A1 | 8/2014 | Kranendonk et al. | |
| 2014/0232743 A1 | 8/2014 | Na et al. | |
| 2014/0258405 A1 | 9/2014 | Perkin | |
| 2014/0265359 A1 | 9/2014 | Cheng et al. | |
| 2014/0266703 A1 | 9/2014 | Dalley, Jr. et al. | |
| 2014/0277735 A1 | 9/2014 | Breazeal | |
| 2014/0279061 A1 | 9/2014 | Elimeliah et al. | |
| 2014/0279436 A1 | 9/2014 | Dorsey et al. | |
| 2014/0279540 A1 | 9/2014 | Jackson | |
| 2014/0280537 A1 | 9/2014 | Pridmore et al. | |
| 2014/0282096 A1 | 9/2014 | Rubinstein et al. | |
| 2014/0287779 A1 | 9/2014 | O'keefe et al. | |
| 2014/0289833 A1 | 9/2014 | Briceno | |
| 2014/0300633 A1* | 10/2014 | Sako | G06V 20/20 345/633 |
| 2014/0306986 A1 | 10/2014 | Gottesman et al. | |
| 2014/0317302 A1 | 10/2014 | Naik | |
| 2014/0324627 A1 | 10/2014 | Haver et al. | |
| 2014/0324629 A1 | 10/2014 | Jacobs | |
| 2014/0325383 A1 | 10/2014 | Brown et al. | |
| 2014/0359024 A1 | 12/2014 | Spiegel | |
| 2014/0359032 A1 | 12/2014 | Spiegel et al. | |
| 2015/0020086 A1 | 1/2015 | Chen et al. | |
| 2015/0040074 A1* | 2/2015 | Hofmann | G06T 19/006 715/852 |
| 2015/0046278 A1 | 2/2015 | Pei et al. | |
| 2015/0071619 A1 | 3/2015 | Brough | |
| 2015/0087263 A1 | 3/2015 | Branscomb et al. | |
| 2015/0088622 A1 | 3/2015 | Ganschow et al. | |
| 2015/0092038 A1* | 4/2015 | Jantunen | G06F 18/00 348/77 |
| 2015/0095020 A1 | 4/2015 | Leydon | |
| 2015/0096042 A1 | 4/2015 | Mizrachi | |
| 2015/0116529 A1 | 4/2015 | Wu et al. | |
| 2015/0134318 A1* | 5/2015 | Cuthbert | G06F 40/58 715/231 |
| 2015/0145888 A1 | 5/2015 | Hanai | |
| 2015/0169827 A1 | 6/2015 | Laborde | |
| 2015/0172534 A1 | 6/2015 | Miyakawa et al. | |
| 2015/0178257 A1 | 6/2015 | Jones et al. | |
| 2015/0178260 A1 | 6/2015 | Brunson | |
| 2015/0193982 A1 | 7/2015 | Mihelich et al. | |
| 2015/0199082 A1 | 7/2015 | Scholler et al. | |
| 2015/0222814 A1 | 8/2015 | Li et al. | |
| 2015/0227602 A1 | 8/2015 | Ramu et al. | |
| 2015/0228122 A1* | 8/2015 | Sadasue | G06T 19/006 345/633 |
| 2015/0261917 A1 | 9/2015 | Smith | |
| 2015/0294503 A1* | 10/2015 | Yang | G06T 19/006 345/633 |

(56) References Cited

U.S. PATENT DOCUMENTS

| | | |
|---|---|---|
| 2015/0312184 A1 | 10/2015 | Langholz et al. |
| 2015/0347854 A1 | 12/2015 | Bare et al. |
| 2015/0350136 A1 | 12/2015 | Flynn, III et al. |
| 2015/0365795 A1 | 12/2015 | Allen et al. |
| 2015/0378502 A1 | 12/2015 | Hu et al. |
| 2016/0006927 A1 | 1/2016 | Sehn |
| 2016/0014063 A1 | 1/2016 | Hogeg et al. |
| 2016/0019239 A1* | 1/2016 | Bastaldo-Tsampalis ............ G06F 18/41 345/632 |
| 2016/0019270 A1 | 1/2016 | Jones et al. |
| 2016/0085773 A1 | 3/2016 | Chang et al. |
| 2016/0085863 A1 | 3/2016 | Allen et al. |
| 2016/0086384 A1 | 3/2016 | Stroila |
| 2016/0086670 A1 | 3/2016 | Gross et al. |
| 2016/0091964 A1* | 3/2016 | Iyer ............ G06V 20/20 715/863 |
| 2016/0099901 A1 | 4/2016 | Allen et al. |
| 2016/0104452 A1 | 4/2016 | Guan et al. |
| 2016/0180887 A1 | 6/2016 | Sehn |
| 2016/0182422 A1 | 6/2016 | Sehn et al. |
| 2016/0182875 A1 | 6/2016 | Sehn |
| 2016/0203586 A1 | 7/2016 | Chang et al. |
| 2016/0217590 A1 | 7/2016 | Mullins et al. |
| 2016/0225164 A1 | 8/2016 | Tomlin et al. |
| 2016/0239248 A1 | 8/2016 | Sehn |
| 2016/0253710 A1 | 9/2016 | Publicover et al. |
| 2016/0266386 A1 | 9/2016 | Scott et al. |
| 2016/0277419 A1 | 9/2016 | Allen et al. |
| 2016/0321708 A1 | 11/2016 | Sehn |
| 2016/0328394 A1* | 11/2016 | Cuthbert ............ G06F 40/58 |
| 2016/0352791 A1 | 12/2016 | Adams et al. |
| 2016/0359957 A1 | 12/2016 | Laliberte |
| 2016/0359987 A1 | 12/2016 | Laliberte |
| 2016/0371884 A1 | 12/2016 | Benko et al. |
| 2017/0006094 A1 | 1/2017 | Abou Mahmoud et al. |
| 2017/0061308 A1 | 3/2017 | Chen et al. |
| 2017/0103124 A1* | 4/2017 | Hassan ............ G06V 20/20 |
| 2017/0124713 A1 | 5/2017 | Jurgenson et al. |
| 2017/0161382 A1 | 6/2017 | Ouimet et al. |
| 2017/0161558 A1 | 6/2017 | Ludwigsen et al. |
| 2017/0200296 A1* | 7/2017 | Jones ............ G09G 5/02 |
| 2017/0228878 A1 | 8/2017 | Goldman et al. |
| 2017/0237789 A1 | 8/2017 | Harner et al. |
| 2017/0243371 A1 | 8/2017 | Jurgenson et al. |
| 2017/0263029 A1 | 9/2017 | Yan et al. |
| 2017/0287006 A1 | 10/2017 | Azmoodeh et al. |
| 2017/0289623 A1 | 10/2017 | Bailey et al. |
| 2017/0295250 A1 | 10/2017 | Samaranayake et al. |
| 2017/0308272 A1 | 10/2017 | Levien et al. |
| 2017/0372526 A1* | 12/2017 | Groten ............ G06T 11/00 |
| 2017/0374003 A1 | 12/2017 | Allen et al. |
| 2017/0374508 A1 | 12/2017 | Davis et al. |
| 2018/0005450 A1 | 1/2018 | Daniels et al. |
| 2018/0061127 A1 | 3/2018 | Gullicksen |
| 2018/0089882 A1 | 3/2018 | Alkouh |
| 2018/0089904 A1 | 3/2018 | Jurgenson et al. |
| 2018/0096502 A1 | 4/2018 | Kansara |
| 2018/0144547 A1 | 5/2018 | Shakib et al. |
| 2018/0189552 A1 | 7/2018 | Barnett et al. |
| 2018/0204372 A1 | 7/2018 | Sudheendra et al. |
| 2019/0073832 A1 | 3/2019 | Kim |
| 2019/0156534 A1 | 5/2019 | Chen et al. |
| 2019/0164346 A1 | 5/2019 | Kim et al. |
| 2019/0295326 A1 | 9/2019 | Jurgenson et al. |
| 2019/0347323 A1 | 11/2019 | Riesa et al. |
| 2020/0020173 A1 | 1/2020 | Sharif |
| 2020/0058151 A1 | 2/2020 | Stukalov |
| 2020/0074705 A1 | 3/2020 | Berger et al. |
| 2020/0219312 A1 | 7/2020 | Jurgenson et al. |
| 2020/0250889 A1 | 8/2020 | Li |
| 2020/0327738 A1 | 10/2020 | Jurgenson et al. |
| 2021/0056760 A1 | 2/2021 | Cowburn et al. |
| 2021/0166455 A1 | 6/2021 | Berger et al. |
| 2021/0174578 A1 | 6/2021 | Jurgenson et al. |
| 2021/0375044 A1 | 12/2021 | George et al. |
| 2022/0076017 A1* | 3/2022 | Cowburn ............ G06V 20/63 |
| 2022/0245907 A1 | 8/2022 | Jurgenson et al. |

FOREIGN PATENT DOCUMENTS

| | | | |
|---|---|---|---|
| CN | 102194254 | 9/2011 | |
| CN | 103471580 A | 12/2013 | |
| CN | 103513951 A | 1/2014 | |
| CN | 104076920 | 10/2014 | |
| CN | 104428817 A | 3/2015 | |
| CN | 104899920 A | 9/2015 | |
| CN | 104995583 A | 10/2015 | |
| CN | 105719350 | 6/2016 | |
| CN | 107209950 | 9/2017 | |
| CN | 108242082 | 7/2018 | |
| CN | 110199245 | 9/2019 | |
| CN | 112639892 A | 4/2021 | |
| CN | 113396443 A | 9/2021 | |
| EP | 2051480 A1 | 4/2009 | |
| EP | 2151797 A1 | 2/2010 | |
| EP | 2439676 A1 * | 4/2012 | ............ G06F 17/289 |
| EP | 3147816 A2 * | 3/2017 | ............ G06F 3/04817 |
| EP | 3369076 A1 | 9/2018 | |
| GB | 2399928 A | 9/2004 | |
| KR | 19990073076 A | 10/1999 | |
| KR | 20010078417 A | 8/2001 | |
| KR | 20110071210 A | 6/2011 | |
| KR | 20120061696 A | 6/2012 | |
| KR | 20130091991 A | 8/2013 | |
| KR | 20130137063 A | 12/2013 | |
| KR | 20150107063 | 9/2015 | |
| KR | 20180026291 | 3/2018 | |
| KR | 20180087918 A | 8/2018 | |
| KR | 102052018 B1 | 12/2019 | |
| KR | 102205689 B1 | 1/2021 | |
| KR | 102534637 B1 | 5/2023 | |
| WO | WO-1996024213 A1 | 8/1996 | |
| WO | WO-1999063453 A1 | 12/1999 | |
| WO | WO-2000058882 A1 | 10/2000 | |
| WO | WO-2001029642 A1 | 4/2001 | |
| WO | WO-2001050703 A3 | 7/2001 | |
| WO | WO-2006118755 A2 | 11/2006 | |
| WO | WO-2007092668 A2 | 8/2007 | |
| WO | WO-2009043020 A2 | 4/2009 | |
| WO | WO-2011040821 A1 | 4/2011 | |
| WO | WO-2011119407 A1 | 9/2011 | |
| WO | WO-2012000107 A1 | 1/2012 | |
| WO | WO-2013003242 A1 * | 1/2013 | ............ G06F 17/289 |
| WO | WO-2013008238 A1 | 1/2013 | |
| WO | WO-2013008251 A2 | 1/2013 | |
| WO | WO-2013045753 A1 | 4/2013 | |
| WO | WO-2014006129 A1 | 1/2014 | |
| WO | WO-2014011346 A1 | 1/2014 | |
| WO | WO-2014068573 A1 | 5/2014 | |
| WO | WO-2014115136 A1 | 7/2014 | |
| WO | WO-2014194262 A2 | 12/2014 | |
| WO | WO-2015069737 A2 * | 5/2015 | ............ G06F 17/289 |
| WO | WO-2015192026 A1 | 12/2015 | |
| WO | WO-2016044424 A1 | 3/2016 | |
| WO | WO-2016054562 A1 | 4/2016 | |
| WO | WO-2016065131 A1 | 4/2016 | |
| WO | WO-2016100318 A2 | 6/2016 | |
| WO | WO-2016100318 A3 | 6/2016 | |
| WO | WO-2016100342 A1 | 6/2016 | |
| WO | WO-2016/112299 A1 | 7/2016 | |
| WO | WO-2016149594 A1 | 9/2016 | |
| WO | WO-2016179166 A1 | 11/2016 | |
| WO | WO-2016179235 A1 | 11/2016 | |
| WO | WO-2017075476 A1 | 5/2017 | |
| WO | WO-2017120660 A1 * | 7/2017 | ............ G06F 3/14 |
| WO | WO-2017176739 A1 | 10/2017 | |
| WO | WO-2017176992 A1 | 10/2017 | |
| WO | WO-2018005644 A1 | 1/2018 | |
| WO | 2018128930 | 7/2018 | |

(56) References Cited

FOREIGN PATENT DOCUMENTS

| WO | WO-2020047259 A1 | 3/2020 |
|----|------------------|--------|
| WO | WO-2020160261 A1 | 8/2020 |

OTHER PUBLICATIONS

Text extraction from natural scene image: A survey, Honggang Zhang et al., Elsevier, 2013, pp. 310-323 (Year: 2013).*
Scene Text Extraction and Translation for Handheld Devices, Ismail Haritaoglu, IEEE, 2001, pp. II-408-II-413 (Year: 2001).*
Framework based on Mobile Augmented Reality for Translating Food Menu in Thai Language to Malay Language, Muhammad Pu et al., 2017, pp. 153-159 (Year: 2017).*
An image-based automatic Arabic translation system, Yi Chang et al., Elsevier, 2009, pp. 2127-2134 (Year: 2009).*
U.S. Appl. No. 17/728,553, filed Apr. 25, 2022, Image Based Tracking in Augmented Reality Systems.
U.S. Appl. No. 14/954,090, U.S. Pat. No. 9,652,896, filed Nov. 30, 2015, Image Based Tracking in Augmented Reality Systems.
U.S. Appl. No. 15/591,887, U.S. Pat. No. 9,836,890, filed May 10, 2017, Image Based Tracking in Augmented Reality Systems.
U.S. Appl. No. 15/830,965, U.S. Pat. No. 10,102,680, filed Dec. 4, 2017, Image Based Tracking in Augmented Reality Systems.
U.S. Appl. No. 16/136,849, U.S. Pat. No. 10,366,543, filed Sep. 20, 2018, Image Based Tracking in Augmented Reality Systems.
U.S. Appl. No. 16/438,226, U.S. Pat. No. 10,733,802, filed Jun. 11, 2019, Image Based Tracking in Augmented Reality Systems.
U.S. Appl. No. 16/913,503, filed Jun. 26, 2020, Image Based Tracking in Augmented Reality Systems.
U.S. Appl. No. 15/492,089, U.S. Pat. No. 10,387,730, filed Apr. 20, 2017, Augmented Reality Typography Personalization System.
U.S. Appl. No. 16/265,382, filed Feb. 1, 2019, Augmented Reality System.
U.S. Appl. No. 16/433,793, U.S. Pat. No. 11,195,018, filed Jun. 6, 2019, Augmented Reality Typography Personalization System.
"A Whole New Story", Snap, Inc., [Online] Retrieved from the Internet: <URL: https://www.snap.com/en-US/news/>, (2017), 13 pgs.
"Adding photos to your listing", eBay, [Online] Retrieved from the Internet: <URL: http://pages.ebay.com/help/sell/pictures.html>, (accessed May 24, 2017), 4 pgs.
"U.S. Appl. No. 14/053,913, Response filed Nov. 13, 2017 to Non Final Office Action dated Jun. 12, 2017", 11 pgs.
"U.S. Appl. No. 14/953,913, Non Final Office Action dated Jun. 12, 2017", 35 pgs.
"U.S. Appl. No. 14/953,913, Notice of Allowance dated Jan. 30, 2018", 23 pgs.
"U.S. Appl. No. 14/954,090, Corrected Notice of Allowance dated Feb. 3, 2017", 4 pgs.
"U.S. Appl. No. 14/954,090, Corrected Notice of Allowance dated Apr. 18, 2017", 4 pgs.
"U.S. Appl. No. 14/954,090, Notice of Allowance dated Jan. 11, 2017", 11 pgs.
"U.S. Appl. No. 14/954,090, Preliminary Amendment filed Dec. 28, 2016", 10 pgs.
"U.S. Appl. No. 15/436,363, Examiner Interview Summary dated Nov. 28, 2018", 3 pgs.
"U.S. Appl. No. 15/436,363, Non Final Office Action dated Oct. 9, 2018", 15 pgs.
"U.S. Appl. No. 15/436,363, Notice of Allowance dated Jan. 29, 2019", 8 pgs.
"U.S. Appl. No. 15/436,363, Response filed Nov. 28, 2018 to Non Final Office Action dated Oct. 9, 2018", 15 pgs.
"U.S. Appl. No. 15/437,018, Corrected Notice of Allowability dated Jul. 11, 2018", 2 pgs.
"U.S. Appl. No. 15/437,018, Corrected Notice of Allowance dated Jun. 6, 2018", 5 pgs.
"U.S. Appl. No. 15/437,018, Examiner Interview Summary dated Feb. 16, 2018", 3 pgs.
"U.S. Appl. No. 15/437,018, Non Final Office Action dated Jan. 26, 2018", 9 pgs.
"U.S. Appl. No. 15/437,018, Notice of Allowance dated May 18, 2018", 7 pgs.
"U.S. Appl. No. 15/437,018, Response Filed Mar. 21, 2018 to Non Final Office Action dated Jan. 26, 2018", 9 pgs.
"U.S. Appl. No. 15/492,089, Corrected Notice of Allowability dated May 24, 2019", 2 pgs.
"U.S. Appl. No. 15/492,089, Non Final Office Action dated Jan. 25, 2019", 7 pgs.
"U.S. Appl. No. 15/492,089, Notice of Allowance dated Apr. 4, 2019", 9 pgs.
"U.S. Appl. No. 15/492,089, Response filed Feb. 26, 2019 to Non Final Office Action dated Jan. 25, 2019", 11 pgs.
"U.S. Appl. No. 15/591,887, Corrected Notice of Allowance dated Sep. 8, 2017", 4 pgs.
"U.S. Appl. No. 15/591,887, Notice of Allowance dated Aug. 25, 2017", 10 pgs.
"U.S. Appl. No. 15/591,887, Preliminary Amendment filed Jun. 12, 2017", 10 pgs.
"U.S. Appl. No. 15/591,887, PTO Response to Rule 312 Communication dated Sep. 19, 2017", 2 pgs.
"U.S. Appl. No. 15/706,074, Non Final Office Action dated Nov. 7, 2018", 26 pgs.
"U.S. Appl. No. 15/706,074, Response filed Mar. 28, 2019 to Non Final Office Action dated Nov. 7, 2018", 14 pgs.
"U.S. Appl. No. 15/830,965, Corrected Notice of Allowability dated Aug. 6, 2018", 4 pgs.
"U.S. Appl. No. 15/830,965, Non Final Office Action dated Feb. 16, 2018", 7 pgs.
"U.S. Appl. No. 15/830,965, Notice of Allowability dated Jul. 5, 2018", 5 pgs.
"U.S. Appl. No. 15/830,965, Notice of Allowance dated Jun. 13, 2018", 8 pgs.
"U.S. Appl. No. 15/830,965, Response filed May 16, 2018 to Non Final Office Action dated Feb. 16, 2018", 10 pgs.
"U.S. Appl. No. 15/971,566, Final Office Action dated Oct. 31, 2018", 38 pgs.
"U.S. Appl. No. 15/971,566, Non Final Office Action dated Feb. 12, 2019", 12 pgs.
"U.S. Appl. No. 15/971,566, Non Final Office Action dated Jun. 14, 2018", 7 pgs.
"U.S. Appl. No. 15/971,566, Response filed Jan. 31, 2019 to Final Office Action dated Oct. 31, 2018", 12 pgs.
"U.S. Appl. No. 15/971,566, Response filed Oct. 15, 2018 to Non Final Office Action dated Jun. 14, 2018", 11 pgs.
"U.S. Appl. No. 16/135,849, Preliminary Amendment filed Oct. 15, 2018", 10 pgs.
"U.S. Appl. No. 16/136,849, Corrected Notice of Allowability dated Apr. 25, 2019", 4 pgs.
"U.S. Appl. No. 16/136,849, Non Final Office Action dated Oct. 17, 2018", 4 pgs.
"U.S. Appl. No. 16/136,849, Notice of Allowance dated Mar. 5, 2019", 7 pgs.
"U.S. Appl. No. 16/136,849, Response filed Jan. 17, 2019 to Non Final Office Action dated Oct. 17, 2018", 9 pgs.
"U.S. Appl. No. 16/265,382, Final Office Action dated Oct. 13, 2020", 21 pgs.
"U.S. Appl. No. 16/265,382, Non Final Office Action dated Mar. 3, 2020", 18 pgs.
"U.S. Appl. No. 16/265,382, Response filed Feb. 12, 2021 to Final Office Action dated Oct. 13, 2020", 11 pgs.
"U.S. Appl. No. 16/265,382, Response filed Aug. 3, 2020 to Non Final Office Action dated Mar. 3, 2020", 10 pgs.
"U.S. Appl. No. 16/433,793, Final Office Action dated Apr. 30, 2021", 9 pgs.
"U.S. Appl. No. 16/433,793, Non Final Office Action dated Jan. 21, 2021", 26 pgs.
"U.S. Appl. No. 16/433,793, Notice of Allowance dated Aug. 6, 2021", 14 pgs.
"U.S. Appl. No. 16/433,793, Response filed Apr. 21, 2021 to Non Final Office Action dated Jan. 21, 2021", 12 pgs.

(56) References Cited

OTHER PUBLICATIONS

"U.S. Appl. No. 16/433,793, Response filed Jun. 30, 2021 to Final Office Action dated Apr. 30, 2021", 9 pgs.
"U.S. Appl. No. 16/438,226, Corrected Notice of Allowability dated May 1, 2020", 4 pgs.
"U.S. Appl. No. 16/438,226, Final Office Action dated Jan. 3, 2020", 10 pgs.
"U.S. Appl. No. 16/438,226, Non Final Office Action dated Jul. 10, 2019", 6 pgs.
"U.S. Appl. No. 16/438,226, Notice of Allowance dated Mar. 26, 2020", 8 pgs.
"U.S. Appl. No. 16/438,226, Response filed Mar. 16, 2020 to Final Office Action dated Jan. 3, 2020", 11 pgs.
"U.S. Appl. No. 16/438,226, Response filed Oct. 8, 2019 to Non-Final Office Action dated Jul. 10, 2019", 11 pgs.
"BlogStomp", StompSoftware, [Online] Retrieved from the Internet: <URL: http://stompsoftware.com/blogstomp>, (accessed May 24, 2017), 12 pgs.
"Cup Magic Starbucks Holiday Red Cups come to life with AR app", Blast Radius, [Online] Retrieved from the Internet: <URL: https://web.archive.org/web/20160711202454/http://www.blastradius.com/work/cup-magic>, (2016), 7 pgs.
"Daily App: InstaPlace (iOS/Android): Give Pictures a Sense of Place", TechPP, [Online] Retrieved from the Internet: <URL: http://techpp.com/2013/02/15/instaplace-app-review>, (2013), 13 pgs.
"Deltatre and Vizrt expanding partnership for Magma Pro Football solution", Vizrt, [Online] Retrieved from the Internet: <URL: http://www.vizrt.com/news/newsgrid/39609/deltatre_and_Vizrt_expanding_partnership_for_Magma_Pro_Football_solution>, (2013), 5 pgs.
"European Application Serial No. 16795488.2, Response filed Dec. 7, 2018 to Communication Pursuant to Rules 161(1) and 162 EPC dated Jun. 7, 2018", w/ English Claims, 114 pgs.
"InstaPlace Photo App Tell the Whole Story", [Online] Retrieved from the Internet: <URL: youtu.be/uF_gFkg1hBM>, (Nov. 8, 2013), 113 pgs., 1:02 min.
"International Application Serial No. PCT/US2015/037251, International Search Report dated Sep. 29, 2015", 2 pgs.
"International Application Serial No. PCT/US2016/059503, International Preliminary Report on Patentability dated May 11, 2018", 7 pgs.
"International Application Serial No. PCT/US2016/059503, International Search Report dated Jan. 23, 2017", 4 pgs.
"International Application Serial No. PCT/US2016/059503, Written Opinion dated Jan. 23, 2017", 5 pgs.
"International Application Serial No. PCT/US2020/015868, International Search Report dated Jul. 10, 2020", 6 pgs.
"International Application Serial No. PCT/US2020/015868, Invitation to Pay Additional Fees dated May 19, 2020", 14 pgs.
"International Application Serial No. PCT/US2020/015868, Written Opinion dated Jul. 10, 2020", 15 pgs.
"Introducing Snapchat Stories", [Online] Retrieved from the Internet: <URL: https://web.archive.org/web/20131026084921/https://www.youtube.com/watch?v=88Cu3yN-LIM>, (Oct. 3, 2013), 92 pgs.; 00:47 min.
"Korean Application Serial No. 10-2017-7035785, Notice of Preliminary Rejection dated Dec. 28, 2018", w/ English Translation, 10 pgs.
"Korean Application Serial No. 10-2017-7035785, Response filed Mar. 12, 2019 to Notice of Preliminary Rejection dated Dec. 28, 2018", w/ English Claims, 25 pgs.
"Macy's Believe-o-Magic", [Online] Retrieved from the Internet: <URL: https://web.archive.org/web/20190422101854/https://www.youtube.com/watch?v=xvzRXy3J0Z0&feature=youtu.be>, (Nov. 7, 2011), 102 pgs.; 00:51 min.
"Macy's Introduces Augmented Reality Experience in Stores across Country as Part of Its 2011 Believe Campaign", Business Wire, [Online] Retrieved from the Internet: <URL: https://www.businesswire.com/news/home/20111102006759/en/Macys-Introduces-Augmented-Reality-Experience-Stores-Country>, (Nov. 2, 2011), 6 pgs.

"Starbucks Cup Magic", [Online] Retrieved from the Internet: <URL: https://www.youtube.com/watch?v=RWwQXi9RG0w>, (Nov. 8, 2011), 87 pgs.; 00:47 min.
"Starbucks Cup Magic for Valentine's Day", [Online] Retrieved from the Internet: <URL: https://www.youtube.com/watch?v=8nvqOzjq10w>, (Feb. 6, 2012), 88 pgs.; 00:45 min.
"Starbucks Holiday Red Cups Come to Life, Signaling the Return of the Merriest Season", Business Wire, [Online] Retrieved from the Internet: <URL: http://www.businesswire.com/news/home/20111115005744/en/2479513/Starbucks-Holiday-Red-Cups-Life-Signaling-Return>, (Nov. 15, 2011), 5 pgs.
Carthy, Roi, "Dear All Photo Apps: Mobli Just Won Filters", TechCrunch, [Online] Retrieved from the Internet: <URL: https://techcrunch.com/2011/09/08/mobli-filters>, (Sep. 8, 2011), 10 pgs.
Castelluccia, Claude, et al., "EphPub: Toward robust Ephemeral Publishing", 19th IEEE International Conference on Network Protocols (ICNP), (Oct. 17, 2011), 18 pgs.
Fajman, "An Extensible Message Format for Message Disposition Notifications", Request for Comments: 2298, National Institutes of Health, (Mar. 1998), 28 pgs.
Janthong, Isaranu, "Instaplace ready on Android Google Play store", Android App Review Thailand, [Online] Retrieved from the Internet: <URL: http://www.android-free-app-review.com/2013/01/instaplace-android-google-play-store.html>, (Jan. 23, 2013), 9 pgs.
Klein, Georg, "Parallel Tracking and Mapping for Small AR Workspaces—Source Code", PTAM Blog, [Online] Retrieved from the Internet on Apr. 3, 2019: <URL: www.robots.ox.ac.uk/~gk/PTAM/>, (Feb. 2014), 2 pgs.
Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.
MacLeod, Duncan, "Macys Believe-o-Magic App", [Online] Retrieved from the Internet: <URL: http://theinspirationroom.com/daily/2011/macys-believe-o-magic-app>, (Nov. 14, 2011), 10 pgs.
MacLeod, Duncan, "Starbucks Cup Magic Lets Merry", [Online] Retrieved from the Internet: <URL: http://theinspirationroom.com/daily/2011/starbucks-cup-magic>, (Nov. 12, 2011), 8 pgs.
Maher, Mary Lou, et al., "Designworld: An Augmented 3D Virtual World for Multidisciplinary, Collaborative Design", University of Sydney, Key Centre for Design Computing and Cognition, (2006), 10 pgs.
Melanson, Mike, "This text message will self destruct in 60 seconds", [Online] Retrieved from the Internet: <URL: http://readwrite.com/2011/02/11/this_text_message_will_self_destruct_in_60_seconds>, (Feb. 18, 2015), 4 pgs.
Nahar, Prakhar, et al., "Autonomous UAV Forced Graffiti Detection and Removal System Based on Machine Learning", IEEE 2017 SmartWorld/SCALCOM/UIC/ATC/CBDCom/IOP/SCI, (2017), 8 pgs.
Narhare, Ashwini D, et al., "Trademark detection using SIFT features matching", IEEE 2015 International Conference on Computing Communication Control and Automation, (2015), 684-688.
Notopoulos, Katie, "A Guide to the New Snapchat Filters and Big Fonts", [Online] Retrieved from the Internet: <URL: https://www.buzzfeed.com/katienotopoulos/a-guide-to-the-new-snapchat-filters-and-big-fonts?utm_term=.bkQ9qVZWe#.nv58YXpkV>, (Dec. 22, 2013), 13 pgs.
Panzarino, Matthew, "Snapchat Adds Filters, a Replay Function and for Whatever Reason, Time, Temperature and Speed Overlays", TechCrunch, [Online] Retrieved form the Internet: <URL: https://techcrunch.com/2013/12/20/snapchat-adds-filters-new-font-and-for-some-reason-time-temperature-and-speed-overlays/>, (Dec. 20, 2013), 12 pgs.
Park, Jungsik, et al., "Interactive Deformation of Real Objects", IEEE International Symposium on Mixed and Augmented Reality (ISMAR), Science and Technology Proceedings, Munich, DE, (Sep. 2014), 295-296.
Raskar, Ramesh, et al., "Table-top spatially-augmented realty: bringing physical models to life with projected imagery", Proceedings 2nd IEEE and ACM International Workshop on Augmented Reality (IWAR'99), San Francisco, USA, (Oct. 20-21, 1999), 64-71.

(56) References Cited

OTHER PUBLICATIONS

Rosten, Edward, "Fast Corner Detection", Edwardrosten.com, [Online] Retrieved from the Internet on Apr. 3, 2019: <URL: https://www.edwardrosten.com/work/fast.html>, (Feb. 25, 2018), 5 pgs.
Sawers, Paul, "Snapchat for iOS Lets You Send Photos to Friends and Set How long They're Visible for", [Online] Retrieved from the Internet: <URL: https://thenextweb.com/apps/2012/05/07/snapchat-for-ios-lets-you-send-photos-to-friends-and-set-how-long-theyre-visible-for/>, (May 7, 2012), 5 pgs.
Sheikh, Md. Abdul Alim, et al., "Traffic Sign Detection and Classification using Colour Feature and Neural Network", IEEE 2016 International Conference on Intelligent Control Power and Instrumentation (ICICPI), (2016), 307-311.
Shein, Esther, "Ephemeral Data", Communications of the ACM, vol. 56, No. 9, (Sep. 2013), 3 pgs.
Taejin, Ha, et al., "ARtalet: Tangible User Interface Based Immersive Augmented Reality Authoring Tool for Digilog Book", IEEE Computer Society, International Symposium on Ubiquitous Virtual Reality, Gwangju, South Korea, (Jul. 7-10, 2010), 40-43.
Tripathi, Rohit, "Watermark Images in PHP and Save File on Server", [Online] Retrieved from the Internet: <URL: http://code.rohitink.com/2012/12/28/watermark-images-in-php-and-save-file-on-server>, (Dec. 28, 2012), 4 pgs.
Vaas, Lisa, "StealthText, Should You Choose to Accept It", [Online] Retrieved from the Internet: <URL: http://www.eweek.com/print/c/a/MessagingandCollaboration/StealthTextShouldYouChoosetoAcceptIt>, (Dec. 13, 2005), 2 pgs.
Wagner, Daniel, et al., "Pose Tracking from Natural Features on Mobile Phones", Proc. of the 7th IEEE/ACM Intl. Symposium on Mixed and Augmented Reality, IEEE Computer Society, (2008), 10 pgs.
"U.S. Appl. No. 16/265,382, Non Final Office Action dated Jun. 3, 2022", 24 pgs.
"Korean Application Serial No. 10-2021-7027590, Notice of Preliminary Rejection dated Jul. 11, 2022", w/ English Translation, 11 pgs.
"U.S. Appl. No. 15/706,074, Examiner Interview Summary dated Feb. 5, 2020", 3 pgs.
"U.S. Appl. No. 15/706,074, Examiner Interview Summary dated Jul. 3, 2019", 3 pgs.
"U.S. Appl. No. 15/706,074, Examiner Interview Summary dated Nov. 1, 2019", 3 pgs.
"U.S. Appl. No. 15/706,074, Final Office Action dated May 10, 2019", 28 pgs.
"U.S. Appl. No. 15/706,074, Final Office Action dated Dec. 19, 2019", 32 pgs.
"U.S. Appl. No. 15/706,074, Non Final Office Action dated Sep. 18, 2019", 29 pgs.
"U.S. Appl. No. 15/706,074, Notice of Allowance dated Mar. 30, 2020", 5 pgs.
"U.S. Appl. No. 15/706,074, Response filed Mar. 19, 2020 to Final Office Action dated Dec. 19, 2019", 12 pgs.
"U.S. Appl. No. 15/706,074, Response filed Jul. 8, 2019 to Final Office Action dated May 10, 2019", 17 pgs.
"U.S. Appl. No. 15/706,074, Response filed Nov. 11, 2019 to Non Final Office Action dated Sep. 18, 2019", 13 pgs.
"U.S. Appl. No. 15/971,566, Advisory Action dated Nov. 22, 2019", 2 pgs.
"U.S. Appl. No. 15/971,566, Final Office Action dated Jul. 16, 2019", 9 pgs.
"U.S. Appl. No. 15/971,566, Notice of Allowability dated Apr. 13, 2020", 2 pgs.
"U.S. Appl. No. 15/971,566, Notice of Allowance dated Jan. 13, 2020", 8 pgs.
"U.S. Appl. No. 15/971,566, Response filed Jun. 12, 2019 to Non Final Office Action dated Feb. 12, 2019", 11 pgs.
"U.S. Appl. No. 15/971,566, Response filed Nov. 15, 2019 to Final Office Action dated Jul. 16, 2019", 13 pgs.
"Application Serial No. 16/014, 193, Corrected Notice of Allowability dated Jan. 28, 2020", 2 pgs.
"Application Serial No. 16/014, 193, Non Final Office Action dated Jun. 28, 2019", 22 pgs.
"Application Serial No. 16/014, 193, Notice of Allowance dated Nov. 27, 2019", 5 pgs.
"Application Serial No. 16/014, 193, Response filed Aug. 22, 2019 to Non-Final Office Action dated Jun. 28, 2019", 12 pgs.
"U.S. Appl. No. 16/119,397, Final Office Action dated May 21, 2020", 17 pgs.
"U.S. Appl. No. 16/119,397, Final Office Action dated Aug. 21, 2020", 18 pgs.
"U.S. Appl. No. 16/119,397, Non Final Office Action dated Jun. 19, 2020", 17 pgs.
"U.S. Appl. No. 16/119,397, Non Final Office Action dated Oct. 1, 2020", 18 pgs.
"U.S. Appl. No. 16/119,397, Non Final Office Action dated Nov. 15, 2019", 14 pgs.
"U.S. Appl. No. 16/119,397, Notice of Allowance dated Dec. 28, 2020", 9 pgs.
"U.S. Appl. No. 16/119,397, Response filed Feb. 18, 2020 to Non Final Office Action dated Nov. 15, 2019", 12 pgs.
"U.S. Appl. No. 16/119,397, Response filed May 29, 2020 to Final Office Action dated May 21, 2020", 12 pgs.
"U.S. Appl. No. 16/119,397, Response filed Jul. 14, 2020 to Non Final Office Action dated Jun. 19, 2020", 12 pgs.
"U.S. Appl. No. 16/119,397, Response filed Sep. 2, 2020 to Final Office Action dated Aug. 21, 2020", 12 pgs.
"U.S. Appl. No. 16/119,397, Response filed Nov. 16, 2020 to Non Final Office Action dated Oct. 1, 2020", 13 pgs.
"U.S. Appl. No. 16/265,382, Advisory Action dated Jan. 12, 2022", 4 pgs.
"U.S. Appl. No. 16/265,382, Final Office Action dated Oct. 29, 2021", 22 pgs.
"U.S. Appl. No. 16/265,382, Non Final Office Action dated May 24, 2021", 23 pgs.
"U.S. Appl. No. 16/265,382, Response filed Mar. 29, 2022 to Advisory Action dated Jan. 12, 2022", 11 pgs.
"U.S. Appl. No. 16/265,382, Response filed Sep. 24, 2021 to Non Final Office Action dated May 24, 2021", 11 pgs.
"U.S. Appl. No. 16/265,382, Response filed Dec. 29, 2021 to Final Office Action dated Oct. 29, 2021", 11 pgs.
"U.S. Appl. No. 16/277,626, Examiner Interview Summary dated Apr. 7, 2020", 3 pgs.
"U.S. Appl. No. 16/277,626, Final Office Action dated Feb. 22, 2021", 18 pgs.
"U.S. Appl. No. 16/277,626, Final Office Action dated May 18, 2020", 30 pgs.
"U.S. Appl. No. 16/277,626, Final Office Action dated Aug. 10, 2020", 35 pgs.
"U.S. Appl. No. 16/277,626, Final Office Action dated Aug. 20, 2021", 24 pgs.
"U.S. Appl. No. 16/277,626, Non Final Office Action dated Mar. 24, 2020", 28 pgs.
"U.S. Appl. No. 16/277,626, Non Final Office Action dated Jul. 12, 2021", 20 pgs.
"U.S. Appl. No. 16/277,626, Non Final Office Action dated Jul. 13, 2020", 34 pgs.
"U.S. Appl. No. 16/277,626, Non Final Office Action dated Nov. 30, 2020", 19 pgs.
"U.S. Appl. No. 16/277,626, Response filed Jan. 28, 2021 to Non Final Office Action dated Nov. 30, 2020", 9 pgs.
"U.S. Appl. No. 16/277,626, Response filed Apr. 28, 2020 to Non Final Office Action dated Mar. 24, 2020", 12 pgs.
"U.S. Appl. No. 16/277,626, Response filed May 11, 2021 to Final Office Action dated Feb. 22, 2021", 10 pgs.
"U.S. Appl. No. 16/277,626, Response filed May 29, 2020 to Final Office Action dated May 18, 2020", 12 pgs.
"U.S. Appl. No. 16/277,626, Response filed Jul. 16, 2020 to Non Final Office Action dated Jul. 13, 2020", 10 pgs.
"U.S. Appl. No. 16/277,626, Response filed Aug. 10, 2021 to Non Final Office Action dated Jul. 12, 2021", 9 pgs.
"U.S. Appl. No. 16/277,626, Response filed Aug. 19, 2020 to Final Office Action dated Aug. 10, 2020", 10 pgs.

(56) References Cited

OTHER PUBLICATIONS

"U.S. Appl. No. 16/277,626, Response filed Oct. 21, 2021 to Final Office Action dated Aug. 20, 2021", 11 pgs.
"U.S. Appl. No. 16/749,678, Final Office Action dated May 13, 2021", 17 pgs.
"U.S. Appl. No. 16/749,678, Non Final Office Action dated Jan. 22, 2021", 19 pgs.
"U.S. Appl. No. 16/749,678, Notice of Allowance dated Jul. 26, 2021", 8 pgs.
"U.S. Appl. No. 16/749,678, Response filed Apr. 21, 2021 to Non Final Office Action dated Jan. 22, 2021", 10 pgs.
"U.S. Appl. No. 16/749,678, Response filed Jul. 13, 2021 to Final Office Action dated May 13, 2021", 8 pgs.
"U.S. Appl. No. 16/824,297, Notice of Allowance dated Dec. 30, 2020", 9 pgs.
"U.S. Appl. No. 16/824,297, Supplemental Notice of Allowability dated Jan. 25, 2021", 2 pgs.
"U.S. Appl. No. 16/824,297, Supplemental Notice of Allowability dated Feb. 18, 2021", 2 pgs.
"U.S. Appl. No. 16/913,503, 312 Amendment filed Mar. 23, 2022", 9 pgs.
"U.S. Appl. No. 16/913,503, Notice of Allowance dated Dec. 23, 2021", 8 pgs.
"U.S. Appl. No. 16/913,503, PTO Response to Rule 312 Communication dated Apr. 1, 2022", 2 pgs.
"U.S. Appl. No. 16/921,487, Final Office Action dated Oct. 15, 2021", 22 pgs.
"U.S. Appl. No. 16/921,487, Non Final Office Action dated Jun. 10, 2021", 19 pgs.
"U.S. Appl. No. 16/921,487, Preliminary Amendment filed Nov. 16, 2020", 8 pgs.
"U.S. Appl. No. 16/921,487, Response filed Sep. 10, 2021 to Non Final Office Action dated Jun. 10, 2021", 12 pgs.
"U.S. Appl. No. 17/248,833, Non Final Office Action dated Sep. 30, 2021", 8 pgs.
"U.S. Appl. No. 17/248,835, Non Final Office Action dated Oct. 1, 2021", 18 pgs.
"Chinese Application Serial No. 201680035045, Response filed Jul. 6, 2021 to Office Action dated Mar. 24, 2021", w/ English Claims, 51 pgs.
"Chinese Application Serial No. 201680035045.X, Office Action dated Mar. 24, 2021", w/o English Translation, 19 pgs.
"Chinese Application Serial No. 201680035045.X, Office Action dated Aug. 5, 2020", w/ English Translation, 11 pgs.
"Chinese Application Serial No. 201680035045.X, Office Action dated Sep. 10, 2021", w/ English Translation, 26 pgs.
"Chinese Application Serial No. 201680035045.X, Response filed Dec. 18, 2020 to Office Action dated Aug. 5, 2020", w/ English Claims, 50 pgs.
"European Application Serial No. 16795488.2, Communication Pursuant to Article 94(3) EPC dated Jun. 30, 2021", 6 pgs.
"European Application Serial No. 16795488.2, Communication Pursuant to Article 94(3) EPC dated Nov. 11, 2020", 6 pgs.
"European Application Serial No. 16795488.2, Response filed Mar. 22, 2021 to Communication Pursuant to Article 94(3) EPC dated Nov. 11, 2020", 23 pgs.
"European Application Serial No. 19854093.2, Extended European Search Report dated Sep. 27, 2021", 7 pgs.
"International Application Serial No. PCT/US2019/048817, International Preliminary Report on Patentability dated Mar. 11, 2021", 7 pgs.
"International Application Serial No. PCT/US2019/048817, International Search Report dated Dec. 13, 2019", 3 pgs.
"International Application Serial No. PCT/US2019/048817, Written Opinion dated Dec. 13, 2019", 5 pgs.
"International Application Serial No. PCT/US2020/015868, International Preliminary Report on Patentability dated Aug. 12, 2021", 17 pgs.
"Korean Application Serial No. 10-2019-7035272, Notice of Preliminary Rejection dated Feb. 5, 2020", w/ English Translation, 9 pgs.
"Korean Application Serial No. 10-2019-7035272, Response filed May 4, 2020 to Notice of Preliminary Rejection dated Feb. 5, 2020", w/ English Claims, 21 pgs.
"Skrite Full Length Commercial", Youtube, [Online] Retrieved from the Internet: <URL: https://www.youtube.com/watch?v=nNx5VeSpk_Y>, (Jun. 27, 2017), 62 pgs.; 1:00 min.
Wei, Guan, "Hybrid methods for robust image matching and its applications in augmented reality", PhD diss., University of Southern California, (2014), 131 pgs.
"U.S. Appl. No. 16/265,382, Final Office Action dated Oct. 18, 2022", 24 pgs.
"U.S. Appl. No. 16/265,382, Non Final Office Action dated Mar. 1, 2023", 27 pgs.
"U.S. Appl. No. 16/265,382, Notice of Allowance dated Sep. 13, 2023", 8 pgs.
"U.S. Appl. No. 16/265,382, Response filed Jan. 18, 2023 to Final Office Action dated Oct. 18, 2022", 11 pgs.
"U.S. Appl. No. 16/265,382, Response filed Aug. 1, 2023 to Non Final Office Action dated Mar. 1, 2023", 12 pgs.
"U.S. Appl. No. 16/265,382, Response filed Oct. 3, 2022 to Non Final Office Action dated Jun. 3, 2022", 11 pgs.
"U.S. Appl. No. 17/728,553, Amendment Under 37 C.F.R. § 1.312 Filed Jul. 27, 2023", 8 pgs.
"U.S. Appl. No. 17/728,553, Corrected Notice of Allowability dated Aug. 16, 2023", 5 pgs.
"U.S. Appl. No. 17/728,553, Non Final Office Action dated Oct. 14, 2022", 5 pgs.
"U.S. Appl. No. 17/728,553, Notice of Allowance dated Apr. 27, 2023", 8 pgs.
"U.S. Appl. No. 17/728,553, PTO Response to Rule 312 Communication dated Aug. 16, 2023", 1 page.
"U.S. Appl. No. 17/728,553, Response filed Jan. 17, 2023 to Non Final Office Action dated Oct. 14, 2022", 12 pgs.
"Korean Application Serial No. 10-2021-7027590, Response filed Oct. 11, 2022 to Notice of Preliminary Rejection dated Jul. 11, 2022", w/ English Claims, 17 pgs.
"Chinese Application Serial No. 202080011762.5, Office Action dated Jul. 27, 2023", w/ English Translation, 27 pgs.
"U.S. Appl. No. 16/265,382, Notice of Allowance dated Dec. 21, 2023", 8 pgs.
"Chinese Application Serial No. 202080011762.5, Response filed Dec. 11, 2023 to Office Action dated Jul. 27, 2023", w/ English claims, 17 pgs.
"Korean Application Serial No. 10-2023-7016588, Notice of Preliminary Rejection dated Jan. 5, 2024", w/ English Translation, 11 pgs.

* cited by examiner

AUGMENTED REALITY TYPOGRAPHY PERSONALIZATION SYSTEM

PRIORITY CLAIM

This application is a continuation of U.S. patent application Ser. No. 16/433,793, filed Jun. 6, 2019, which application is a continuation of U.S. patent application Ser. No. 15/492,089, filed Apr. 20, 2017, now issued as U.S. Pat. No. 10,387,730, which applications and publications are incorporated herein by reference in their entirety.

TECHNICAL FIELD

Embodiments of the present disclosure relate generally to mobile computing technology and, more particularly, but not by way of limitation, to the presentation of augmented and virtual reality displays.

BACKGROUND

Augmented reality (AR) is a live direct or indirect view of a physical, real-world environment whose elements are supplemented, or "augmented," by a computer-generated sensory input such as sound, video, graphics, or the like. As a result, the technology functions to enhance a user's perception of reality.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
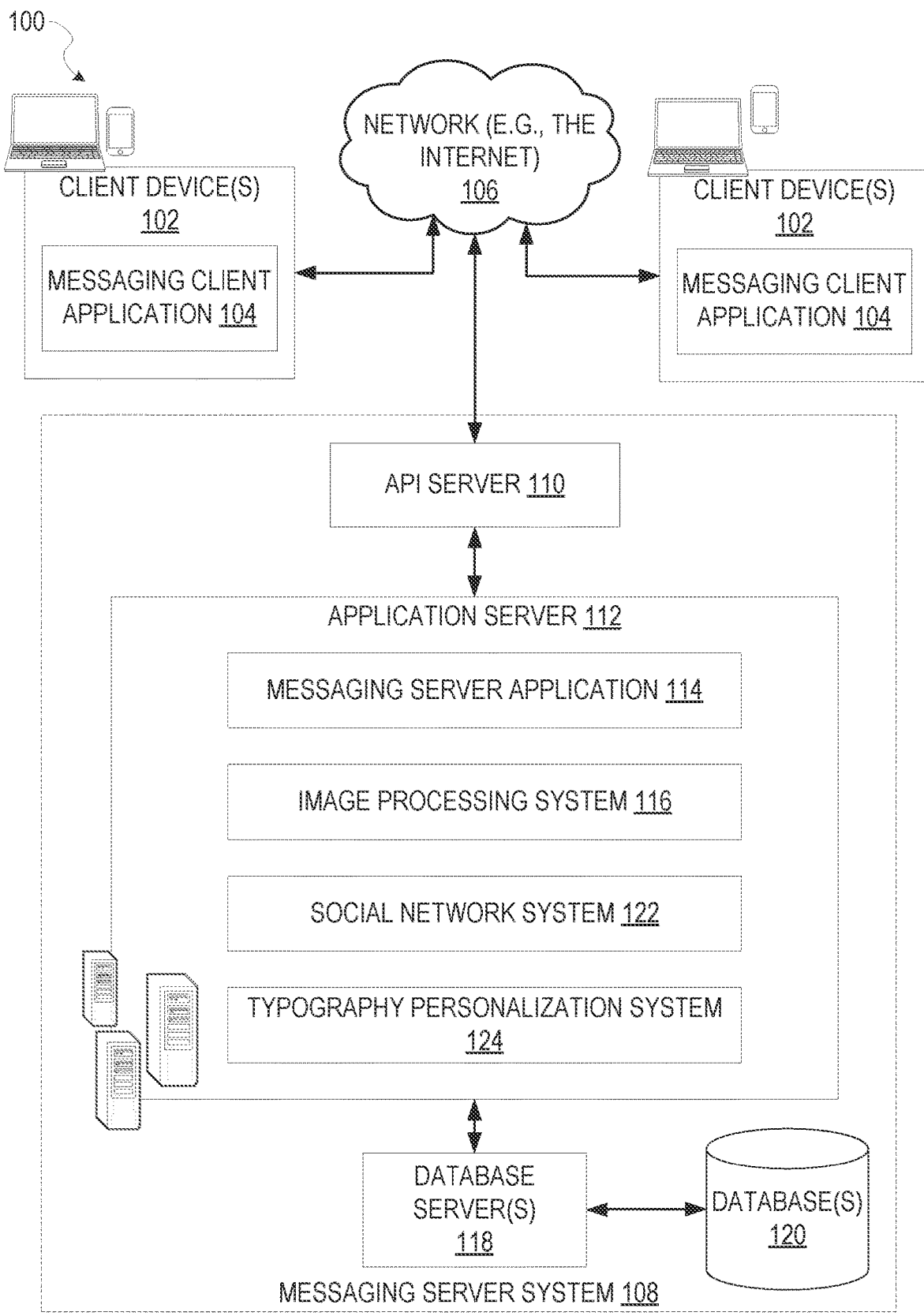
FIG. 1 is a block diagram showing an example messaging system for exchanging data (e.g., messages and associated content) over a network in accordance with some embodiments, wherein the messaging system includes an augmented reality anamorphosis system.

Reference will now be made in detail to specific example embodiments for carrying out the inventive subject matter of the present disclosure. In the following description, specific details are set forth in order to provide a thorough understanding of the subject matter. It shall be appreciated that embodiments may be practiced without some or all of these specific details.

Disclosed are augmented reality (AR) personalization systems to enable a user to edit and personalize presentations of real-world typography in real-time. In other words, various embodiments allow text in a picture or video captured by a phone to be automatically analyzed to allow simple user editing of the text. The analysis and editing features allow the edited picture or video to maintain the look and feel of the original. In some embodiments, networked features allow one user to edit text on a sign at a particular location on first device and share those edits. A second user capturing an image of the sign using the AR personalized system will see the text edits from the first user displayed on the screen of the second device. Users viewing a sign at the same time through AR displays can see real-time updates and text edits as they are made by other users.

The AR personalization system captures an image depicting a physical location via a camera coupled to a client device. For example, the client device may be a mobile device that includes a camera configured to record and display images (e.g., photos, videos) in real-time. The AR personalization system causes display of the image at the client device, and scans the image to detect occurrences of typography within the image (e.g., signs, billboards, posters, graffiti). For example, the image may include a stop-sign. The AR personalization system may detect the text string displayed on the stop-sign that reads "STOP."

In some example embodiments, in response to detection of typography within an image, the AR personalization system identifies properties of the typography. The AR personalization system may employ Natural Feature Tracking (NFT) techniques to identify locations of the occurrences of typography. The properties of the typography may for example include a set of characters, a height of the text, a length of the text, and a number of characters in the text, as well as a location of the text in the image, a color of the text, an opacity of the text, and in some embodiments a typeface, a font (e.g., a size, weight, and style of the typeface), or that the typeface is serif or sans serif. Using the stop-sign example above, the AR personalization system may determine features such as: a relative size of the typography in the image based on properties of the image that the character-set of the text string includes the letters "S," "T," "O," and "P,"; that the characters of the text string are white; and that the characters of the text string are sans serif (or that they are "Ariel Narrow").

In further embodiments, the AR typography personalization system identifies background patterns in which the typography may be overlaid or displayed upon. Background patterns may include solid colors (e.g., red, blue, orange), textile patterns (e.g., check, tartan, gingham), as well as features of an environment depicted in the image (e.g., bricks on a brick wall, trees, bushes, concrete, asphalt, clouds, etc.). Continuing with the stop-sign example discussed above, the AR personalization system may determine that the background of the typography is a solid red color.

The AR personalization system may receive a request to alter, modify, or personalize the occurrences of typography detected in the image. The request may include a user input selecting an occurrence of typography in the image, received from a client device. For example, a user viewing a presentation of the image at the client device may select the occurrence of typography in the image, and in response the AR personalization system may overlay a text field at a position on the occurrence of typography to receive text inputs over the occurrence of typography in the image. For example, the AR personalization system identifies tracking indicia that include features of an environment or active light sources in proximity to annotated objects within the environment (e.g., the ground's plane, or the horizon). Based on the positions of three or more known features in the environment, the AR personalization system generates and causes display of the text field over the occurrence of typography. Thus, as the user moves to different perspectives, the text field (and ultimately the altered typography) may remain in a consistent position.

The user may provide user inputs into the text field to delete or otherwise alter characters in the text string. Continuing with the stop-sign example discussed above, the AR personalization may receive a user input selecting the typography of the stop-sign. In response to receiving the selection of the typography of the stop-sign, the AR personalization system causes display of a text field over the typography of the stop-sign.

The user may provide a user input into the text field to delete, change, or add to the one or more characters of the text string. For example, the user may alter the text string in the presentation of the image by deleting the "O" from the character-set and replacing it with an "A" and an "H." The AR personalization system generates characters to display in the presentation of the image based on the properties of the text string, such as the size, color, and typeface. In response to receiving the user inputs modifying the text string, the AR personalization system updates the presentation of the image such that the text string displays as "STAHP" at the client device.

In some example embodiments, the AR personalization system provides functionality to tag the personalization requests to a particular occurrence of typography at one or more locations based factors including on geo-location coordinates, as well as properties of the typography. For example, a user may tag a personalization request to alter/personalize all occurrences of a text string that includes certain properties (e.g., a character-set, a location, a background, etc.) detected by the AR personalization system, or alter/personalize a presentation of a specific occurrence of typography based on location data at multiple client devices.

For example, a user may create a personalization request for a specific word or phrase (e.g., "STAR WARS," "STOP," "CAUTION"), wherein the specific word or phrase may appear at multiple different locations. Upon detecting an occurrence of the specific word or phrase, based on properties of the specific word or phrase (e.g., characters, positions of the characters), the AR personalization system may apply the personalization request to alter a presentation of the word or phrase, in real-time.

The personalization request may include geolocation coordinates, as well as user identifiers of a set of users authorized to view the personalized typography. For example, a user may generate a personalization request that includes personalized typography, geolocation coordinates, an indication of an occurrence of typography to alter in a presentation, and a set of user identifiers. Upon detecting users identified by the user identifiers at the location specified by the geolocation coordinates, the AR personalization system alters a presentation of the occurrence of typography displayed at their corresponding user devices to include the personalization request. For example, a user may generate a personalization request to alter a presentation of an occurrence of typography (e.g., a movie poster). The personalization request includes an indication of the occurrence of typography, changes to be made to the occurrence of typography (e.g., a character or string of characters to add), geolocation coordinates, as well as a list of user identifiers that includes user identifier X. For example, a user may select the occurrence of typography within the presentation, and in response, the AR personalization system may apply NFT systems to identify features within the presentation to identify and mark the occurrence of typography. The user may provide the AR personalization system with a set of changes that include new characters to add to the occurrence of typography, as well as an indication of a position in which to place the changes in the presentation. The user identified by user identifier X may display a presentation of the occurrence of the text string at a corresponding client device. In response, the AR personalization system identifies the user and alters the presentation based on the personalization request.

FIG. 1 is a block diagram showing an example messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video or other multimedia data which may include or be used as anamorphic media).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. In some embodiments, this data includes, message content, client device information, geolocation information, media annotation and overlays, message content persistence conditions, social network information, and live event information, as examples. In other embodiments, other data is used. Any such data may be used as part of or to generate anamorphic media in accordance with different embodiments described herein. Data exchanges within the messaging system 100 are invoked and controlled through functions available via user interfaces (UIs) of the messaging client application 104.

Turning now specifically to the messaging server system 108, an Application Program Interface (API) server 110 is coupled to, and provides a programmatic interface to, an application server 112. The application server 112 is communicatively coupled to a database server(s) 118, which facilitates access to a database(s) 120 in which is stored data associated with messages processed by the application server 112.

Dealing specifically with the Application Program Interface (API) server 110, this server receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, opening and application event (e.g., relating to the messaging client application 104).

The application server 112 hosts a number of applications and subsystems, including a messaging server application 114, an image processing system 116, a social network system 122, and an typography personalization system 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

The social network system 122 supports various social networking functions services, and makes these functions and services available to the messaging server application 114. To this end, the social network system 122 maintains and accesses an entity graph 304 within the database(s) 120. Examples of functions and services supported by the social network system 122 include the identification of other users of the messaging system 100 with which a particular user has relationships or is "following," and also the identification of other entities and interests of a particular user. The typography personalization system 124 provides functionality to identify and enable personalization of occurrences of typography identified in a presentation of an image at a client device (e.g., client device 102).

The application server 112 is communicatively coupled to one or more database server(s) 118, which facilitates access to a database(s) 120 in which is stored data associated with messages processed by the messaging server application 114.

Figure 2:
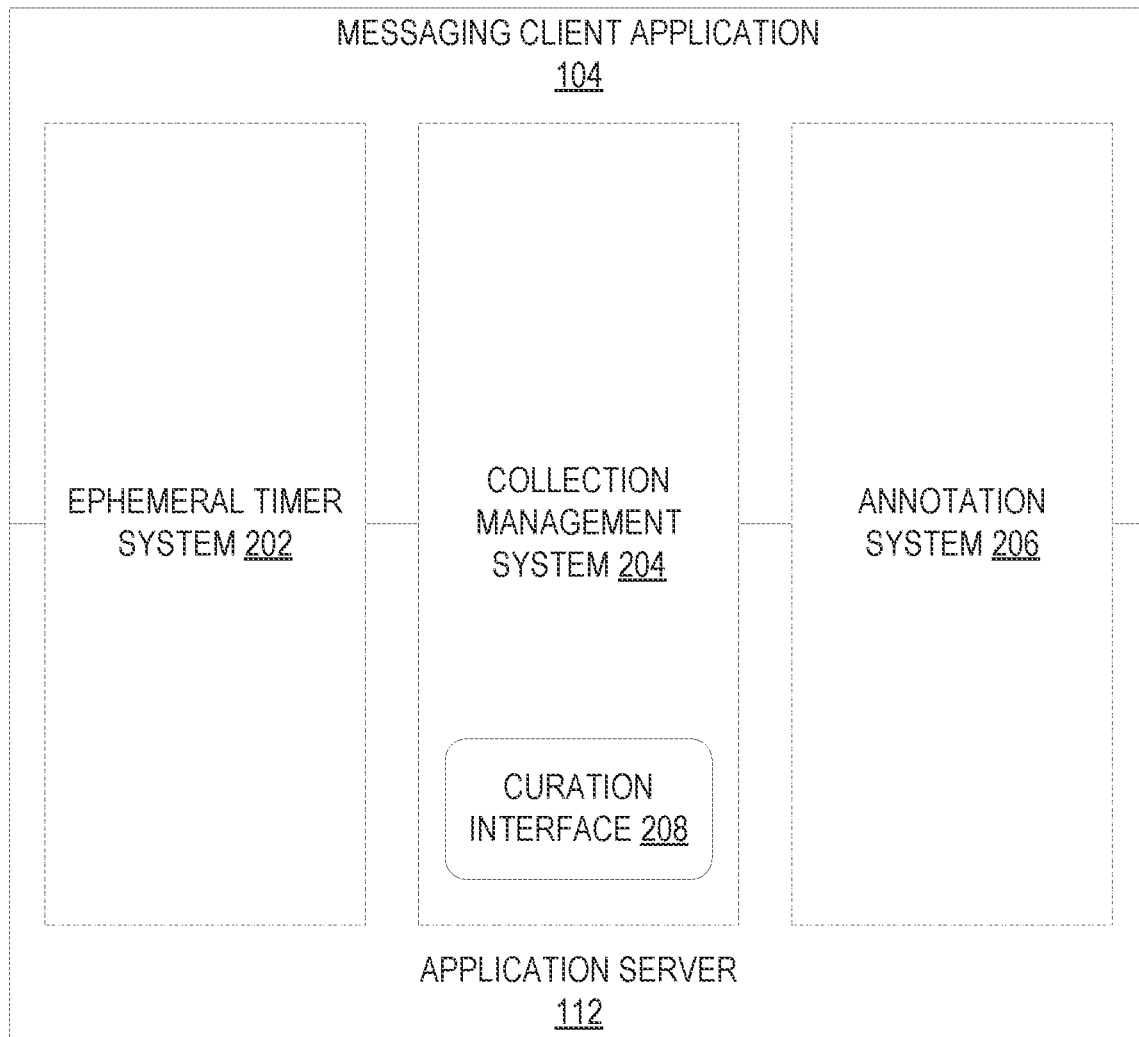
FIG. 2 is block diagram illustrating further details regarding a messaging system, according to example embodiments.

FIG. 2 is block diagram illustrating further details regarding the messaging system 100, according to example embodiments. Specifically, the messaging system 100 is shown to comprise the messaging client application 104 and the application server 112, which in turn embody a number of some subsystems, namely an ephemeral timer system 202, a collection management system 204 and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, or collection of messages (e.g., a SNAPCHAT story), selectively display and enable access to messages and associated content such as anamorphic media via the messaging client application 104. Further details regarding the operation of the ephemeral timer system 202 are provided below.

The collection management system 204 is responsible for managing collections of media (e.g., collections of text, image video and audio data). In some examples, a collection of content (e.g., messages, including personalized typography, images, video, text and audio) may be organized into an "event gallery" or an "event story." Such a collection may be made available for a specified time period, such as the duration of an event to which the content relates. For example, content such as personalized augmented reality typography displayed at specific locations based on geolocation coordinates and features of an environment may be made available as a "story" for the duration of a time period. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay (e.g., a SNAPCHAT filter) to the messaging client application 104 based on a geolocation of the client device 102. In another example, the annotation system 206 operatively supplies a media overlay to the messaging client application 104 based on other information, such as, social network information of the user of the client device 102. A media overlay may include audio and visual content and visual effects. Examples of audio and visual content include anamorphic media, pictures, texts, logos, animations, and sound effects. An example of a visual effect includes color overlaying, or projecting an anamorphic media item over a presentation depicting a space. The audio and visual content or the visual effects can be applied to a media content item (e.g., a photo) at the client device 102. For example, the media overlay including text that can be overlaid on top of a photograph or video stream generated taken by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database(s) 120 and accessed through the database server(s) 118.

In one example embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

Figure 3:
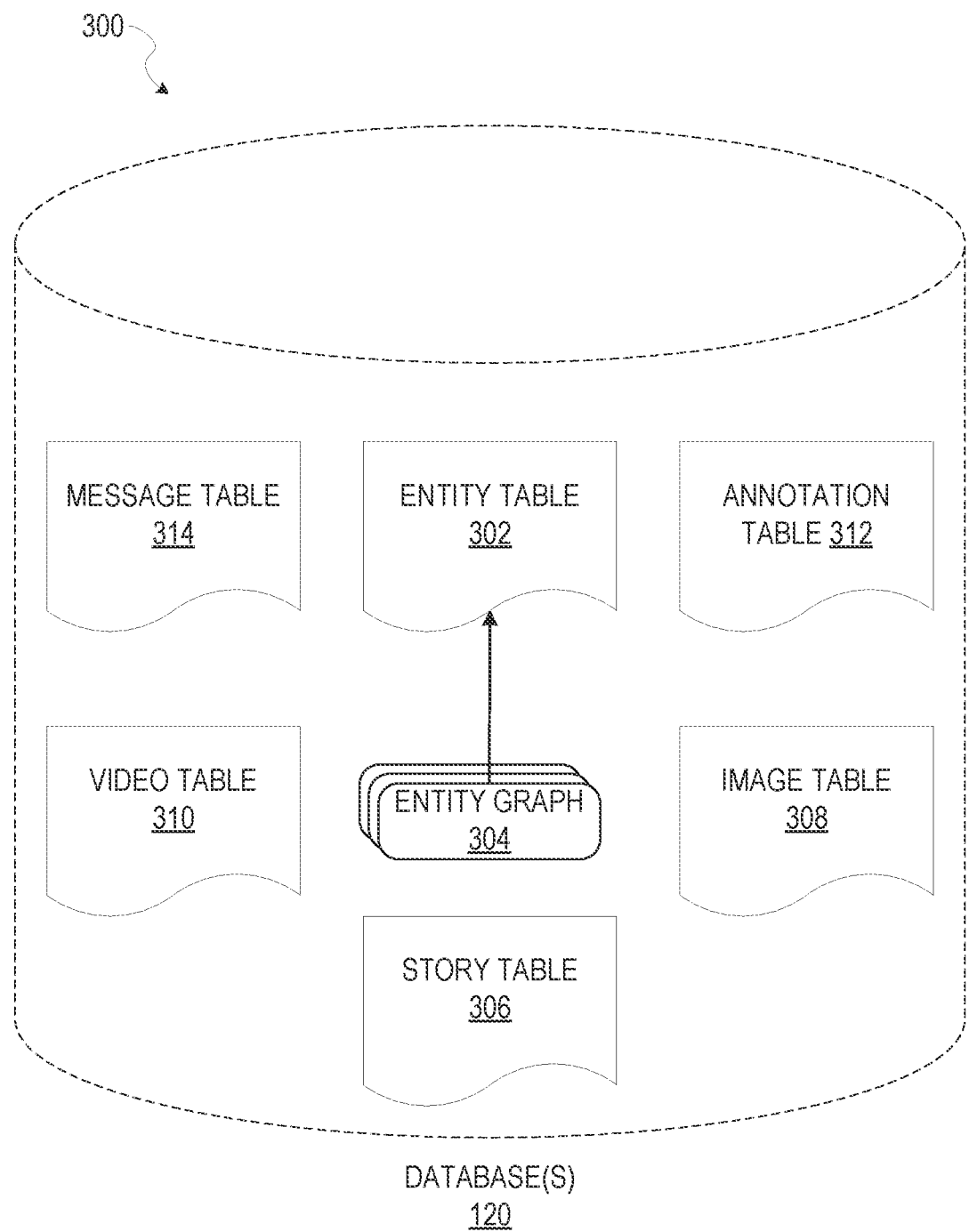
FIG. 3 is a schematic diagram illustrating data that may be stored in the database of the messaging server system, according to certain example embodiments.

In another example embodiment, the annotation system 206 provides a merchant-based publication platform that enables merchants to select a particular media overlay associated with a geolocation via a bidding process. For example, the annotation system 206 associates the media overlay of a highest bidding merchant with a corresponding geolocation for a predefined amount of time FIG. 3 is a schematic diagram 300 illustrating data which may be stored in the database(s) 120 of the messaging server system 108, according to certain example embodiments. While the content of the database(s) 120 is shown to comprise a number of tables, it will be appreciated that the data could be stored in other types of data structures (e.g., as an object-oriented database).

The database(s) 120 includes message data stored within a message table 314. The entity table 302 stores entity data, including an entity graph 304. Entities for which records are maintained within the entity table 302 may include individuals, corporate entities, organizations, objects, places, events etc. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between entities. Such relationships may be social, professional (e.g., work at a common corporation or organization) interested-based or activity-based, merely for example.

The database(s) 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays (e.g., anamorphic media items) that are displayed as overlaid on an image or video during presentation to a recipient user. For example, the overlay may include an anamorphic media item displayed within a presentation of a space, such that the anamorphic media item appears to be projected over a set of three dimensional surfaces of a space, following the contours of the surfaces of the space. Filters may be of varies types, including a user-selected filters from a gallery of filters presented to a sending user by the messaging client application 104 when the sending user is composing a message. Other types of filers include geolocation filters (also known as geo-filters) which may be presented to a sending user based on geographic location. For example, geolocation filters specific to a neighborhood or special location may be presented within a user interface by the messaging client application 104, based on geolocation information determined by a GPS unit of the client device 102. Another type of filer is a data filer, which may be selectively presented to a sending user by the messaging client application 104, based on other inputs or information gathered by the client device 102 during the message creation process. Example of data filters include current temperature at a specific location, a current speed at which a sending user is traveling, battery life for a client device 102 or the current time.

Other annotation data that may be stored within the image table 308 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the entity table 302. The entity table 302 may associate various annotations from the annotation table 312 with various images and videos stored in the image table 308 and the video table 310.

A story table 306 stores data regarding collections of messages and associated image, video or audio data, which are compiled into a collection (e.g., a SNAPCHAT story or a gallery). The creation of a particular collection may be initiated by a particular user (e.g., each user for which a record is maintained in the entity table 302) A user may create a "personal story" in the form of a collection of content that has been created and sent/broadcast by that user. To this end, the user interface of the messaging client application 104 may include an icon that is user selectable to enable a sending user to add specific content to his or her personal story.

A collection may also constitute a "live story," which is a collection of content from multiple users that is created manually, automatically or using a combination of manual and automatic techniques. For example, a "live story" may constitute a curated stream of user-submitted content from varies locations and events. Users, whose client devices have location services enabled and are at a common location event at a particular time may, for example, be presented with an option, via a user interface of the messaging client application 104, to contribute content to a particular live story. The live story may be identified to the user by the messaging client application 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 4:
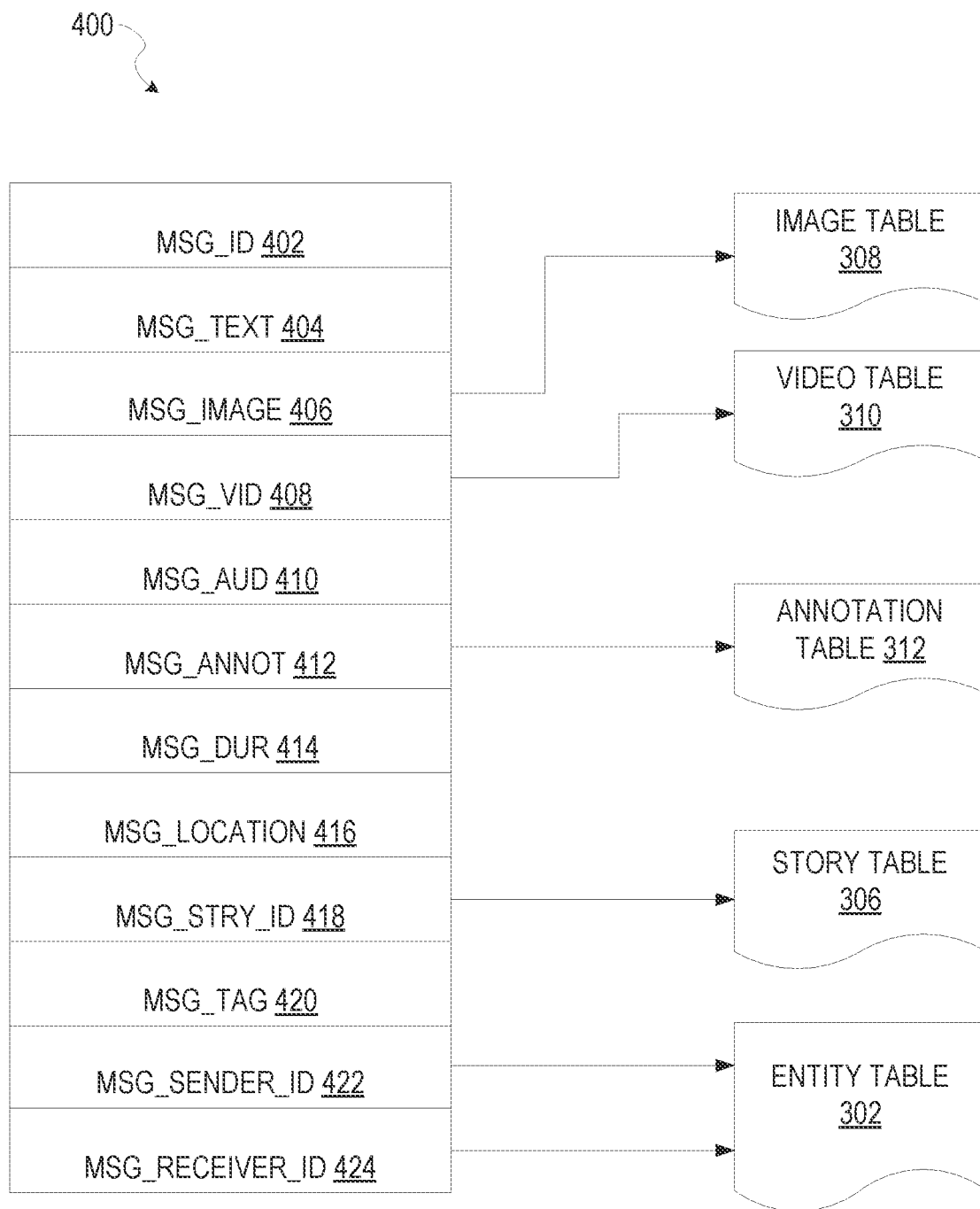
FIG. 4 is a schematic diagram illustrating a structure of a message, according to some embodiments, generated by a messaging client application for communication.

FIG. 4 is a schematic diagram illustrating a structure of a message 400, according to some in some embodiments, generated by a messaging client application 104 for communication to a further messaging client application 104 or the messaging server application 114. The content of a particular message 400 is used to populate the message table 314 stored within the database(s) 120, accessible by the messaging server application 114. Similarly, the content of a message 400 is stored in memory as "in-transit" or "in-flight" data of the client device 102 or the application server 112. The message 400 is shown to include the following components:

- A message identifier 402: a unique identifier that identifies the message 400.
- A message text payload 404: text, to be generated by a user via a user interface of the client device 102 and that is included in the message 400.
- A message image payload 406: image data, captured by a camera component of a client device 102 or retrieved from memory of a client device 102, and that is included in the message 400.
- A message video payload 408: video data, captured by a camera component or retrieved from a memory component of the client device 102 and that is included in the message 400.
- A message audio payload 410: audio data, captured by a microphone or retrieved from the memory component of the client device 102, and that is included in the message 400.
- A message annotations 412: annotation data (e.g., filters, stickers or other enhancements) that represents annotations to be applied to message image payload 406, message video payload 408, or message audio payload 410 of the message 400.
- A message duration parameter 414: parameter value indicating, in seconds, the amount of time for which content of the message (e.g., the message image payload 406, message video payload 408, message audio payload 410) is to be presented or made accessible to a user via the messaging client application 104.
- A message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).
- A message story identifier 418: identifier values identifying one or more content collections (e.g., "stories") with which a particular content item in the message image payload 406 of the message 400 is associated. For example, multiple images within the message image payload 406 may each be associated with multiple content collections using identifier values.
- A message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.
- A message sender identifier 422: an identifier (e.g., a messaging system identifier, email address or device identifier) indicative of a user of the client device 102 on which the message 400 was generated and from which the message 400 was sent
- A message receiver identifier 424: an identifier (e.g., a messaging system identifier, email address or device identifier) indicative of a user of the client device 102 to which the message 400 is addressed.

The contents (e.g. values) of the various components of message 400 may be pointers to locations in tables within which content data values are stored. For example, an image value in the message image payload 406 may be a pointer to (or address of) a location within an image table 308. Similarly, values within the message video payload 408 may point to data stored within a video table 310, values stored within the message annotations 412 may point to data stored in an annotation table 312, values stored within the message story identifier 418 may point to data stored in a story table 306, and values stored within the message sender identifier 422 and the message receiver identifier 424 may point to user records stored within an entity table 302.

Figure 5:
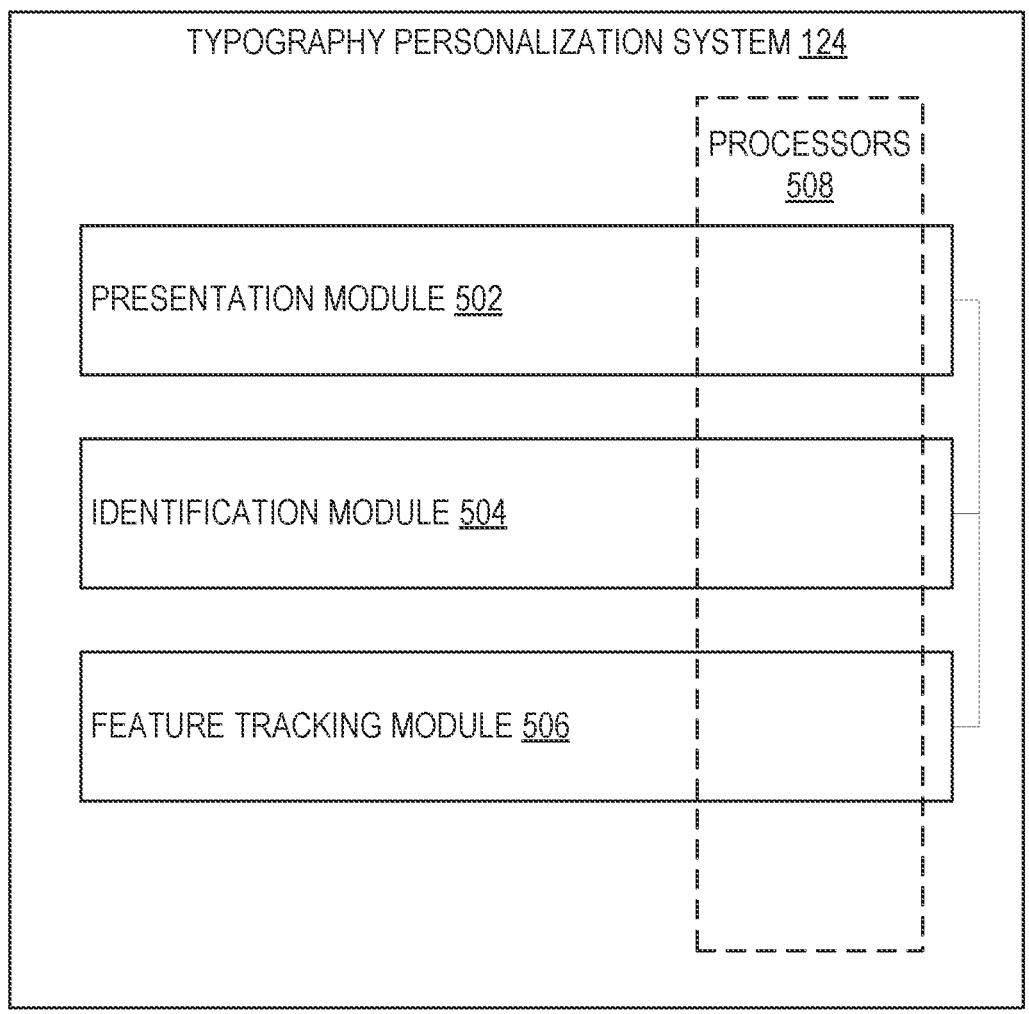
FIG. 5 is a block diagram illustrating various modules of a typography personalization system, according to certain example embodiments.

FIG. 5 is a block diagram 500 illustrating components of the typography personalization system 124, that configure the typography personalization system 124 to identify occurrences of typography in a presentation of an image, and enable personalization of the typography, according to various example embodiments. The typography personalization system 124 is shown as including a presentation module 502, an identification module 504, and a feature tracking module 506, all, or some, configured to communicate with each other (e.g., via a bus, shared memory, or a switch). Any one or more of these modules may be implemented using one or more processors 508 (e.g., by configuring such one or more processors to perform functions described for that module) and hence may include one or more of the processors 508.

Any one or more of the modules described may be implemented using hardware alone (e.g., one or more of the processors 508 of a machine) or a combination of hardware and software. For example, any module described of the typography personalization system 124 may physically include an arrangement of one or more of the processors 508 (e.g., a subset of or among the one or more processors of the machine) configured to perform the operations described herein for that module. As another example, any module of the typography personalization 124 may include software, hardware, or both, that configure an arrangement of one or more processors 508 (e.g., among the one or more processors of the machine) to perform the operations described herein for that module. Accordingly, different modules of the typography personalization system 124 may include and configure different arrangements of such processors 508 or a single arrangement of such processors 508 at different points in time. Moreover, any two or more modules of the typography personalization system 124 may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 6:
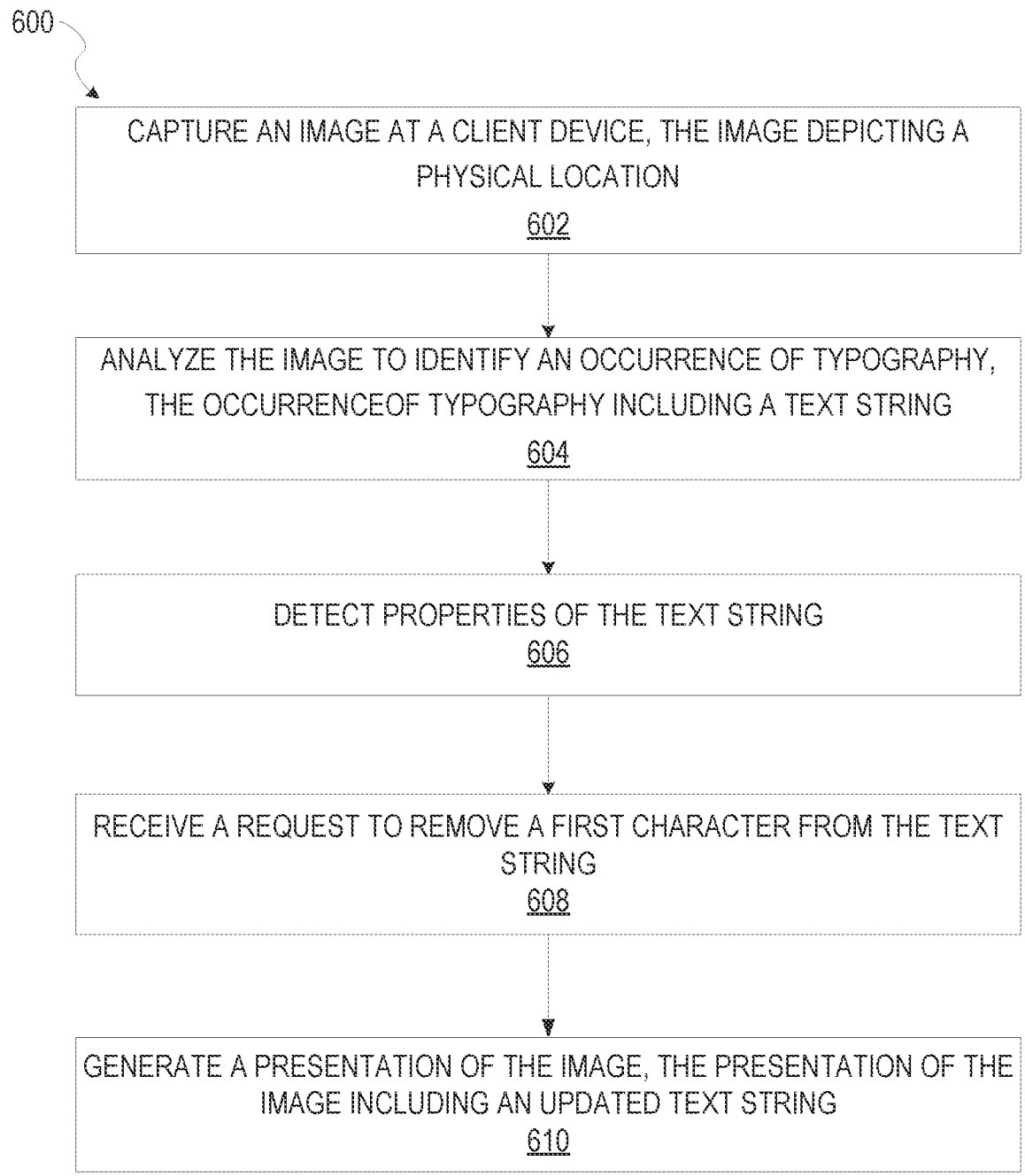
FIG. 6 is a flowchart illustrating various operations of the typography personalization system in personalizing an occurrence of typography within a presentation of an image, according to certain example embodiments.

FIG. 6 is a flowchart illustrating various operations of the typography personalization system 124 in performing a method 600 for personalizing an occurrence of typography within a presentation of an image, according to certain example embodiments. Operations of the method 600 may be performed by the modules described above with respect to FIG. 5. As shown in FIG. 6, the method 600 includes one or more operations 602, 604, 606, 608, and 610.

Operations 602 and 604 may be performed by the presentation module 502. At operation 602, the presentation module 502 captures an image depicting a physical location. For example, the client device 102 may include a camera element configured to record images of a physical location. The presentation module 502 may access the camera element of the client device 102 and generate an image based on the recorded images. For example, the image captured by the presentation module 502 may include video or still images.

At operation 604, the presentation module 502 analyzes the image to identify one or more occurrences of typography within the image. As discussed above, the image may depict a physical location, wherein the physical location includes one or more occurrences of typography. For example, the image may depict a street intersection that includes street signs, stop signs, billboards, as well as cars with license plates, that all include occurrences of typography. The occurrences of typography therefore could include text strings such as the word "STOP" on a stop sign, the letters and numbers of a license plate, as well as a word or phrase presented on a billboard. The occurrences of typography may also include corresponding background patterns. For example, in the case of a stop sign, the typography of the stop sign "STOP" is presented over a red background, while a logo painted on a brick wall would have a brick background.

Operation 606 may be performed by the identification module 504. At operation 606, the identification module 504 identifies properties of the occurrences of typography within the presentation of the images. The properties of the typography may for example include size (e.g., height, length, number of characters), location (i.e., where it is in the image), color, opacity, a character-set (i.e., the letters and numbers that make up the typography) and in some embodiments a typeface (or that the typeface is serif or sans serif).

In some example embodiments, the identification module 504 identifies positions of the occurrences of typography in the presentation of the image based on NFT techniques. For example, the identification module 504 may identify one or more features within the presentation and determines a relative position of the occurrences of typography relative to one another and in relation to the features.

In some example embodiments, the identification module 504 identifies a typeface and a font of the typeface, of an occurrence of typography. Having determined the front and the typeface of the occurrence of typography, the identification module 504 compares the font and the typeface against a catalogue of fronto-parallel views of fonts and typefaces to determine deformities of the occurrence of typography. Based on the deformities of the occurrence of typography, the identification module 504 may identify a position and geometry of a surface in which the occurrence of typography appears, in order to identify a shape of the surface.

For example, the identification module 504 identifies a typeface of the occurrence of typography based on properties of the text string. In response to identifying the typeface, the identification module 504 compares the text string against a set of characters from a catalogue of characters, based on the typeface (e.g., Times New Roman, Ariel, Wingdings, etc.), to identify evidence of distortion and deformities in the text string. Based on the distortion and deformities, the identifications module 504 determines a shape of a surface in which the text string appears.

Operations 608 and 610 may be performed by the presentation module 502. At operation 608, the presentation module 502 receives a personalization request to alter or edit one or more of the occurrences of typography identified in the presentation of the image. For example, the personalization request may include a request to remove one or more characters from a text string (e.g., the typography). In some example embodiments, the feature tracking module 506 generates and causes display of a text field to receive changes (e.g., deletions and additions) to the typography at positions overlaid upon the occurrences of typography. For example, the feature tracking module 506 may identify one or more features within the presentation, and generate and cause display of the text fields at positions within the presentation such that as the user moves, the text fields remain in their relative positions. The user may select one or more of the occurrences of typography and provide changes (e.g., additions, deletions) directly into the text field.

In some example embodiments, the personalization request may include a request to alter or change other feature of the occurrence of typography, beyond the typography itself. For example, a user may provide inputs specifying that a background color or pattern within the presentation be changed (e.g., change a red sign to a green sign). In further embodiments, the personalization request may include a request to add an image retrieved from a database to the presentation. For example, a user may access a database or repository of images that includes an image of a face, and specify a location within the presentation in which to add the image of the face. In this way, a user may alter or otherwise change elements within the presentation beyond simply the typography itself. For example, the personalization request may specify that all occurrences of the word "apple" identified within an image be replaced with a picture selected by the user (e.g., an image of an apple).

At operation 610, the presentation module 502 generates a presentation of the image, wherein the presentation of the image includes an updated text string based on the personalization request. In some example embodiments, the updated txt string may be presented based on the form of the surface identified by the identification module 504, based on deformities of the typeface. For example, one or more characters of the text string may be changed or removed from the image, and replaced with new characters, or simply filled in with the background pattern.

As an illustrative example, the occurrence of typography identified by the identification module 504 may include a billboard that includes an advertisement with a text string that reads "WINCHESTER MYSTERY HOUSE." The identification module 504 identifies the text string, and a position of the text string in the presentation, and generates and causes display of a text field at the location of the text string (overlaid on top of the text string in the presentation of the image).

A user selects the text string and provides inputs directly into the text field to personalize the typography. The inputs may for example include: adding or deleting characters, changing colors of the typography, changing a typeface of the typography, translating the typography into a different language (e.g., English to Chinese), and changing a size of the typography. For example, the user may change or delete one or more characters of the text string ("WINCHESTER MYSTERY HOUSE") such that the presentation displays the text string as "WINCHESTER MYSTERY MOUSE," or anything else.

In some example embodiments, the typography personalization system 124 may identify and alter a presentation that includes the occurrence of typography, in response to the identification module 504 detecting the occurrence of typography based on attributes of the typography (e.g., a set of characters, a typeface, a color, an image among the characters, a logo, etc.). For example, a user may generate a personalization request that alters all occurrences of the word "EXIT" detected by the identification module 504, in real-time.

In further embodiments, the user may attach the personalization request to a message, wherein the message is deliverable to one or more client devices (e.g., a recipient), and the recipients of the message may similarly alter presentations of images that include the occurrence of typography of the personalization request. For example, the personalization request may be tagged to a specific word or phrase, such that when the identification module 504 detects the word or phrase, the presentation module 502 alters the presentation based on the personalization request.

In further embodiments, the personalization may be tied to a specific occurrence of typograph (e.g., a word or phrase), and a creator of the personalization request may alter the personalization request, such that presentations of the occurrence of typography displayed at recipient devices are altered in real time. For example, a creating user may create a personalization request for occurrences of the word "STOP," and transmit the personalization request to a recipient. As the creating user alter the personalization request, displays of the word "STOP" at the recipient device may be altered by the presentation module 502, in real-time.

Figure 7:
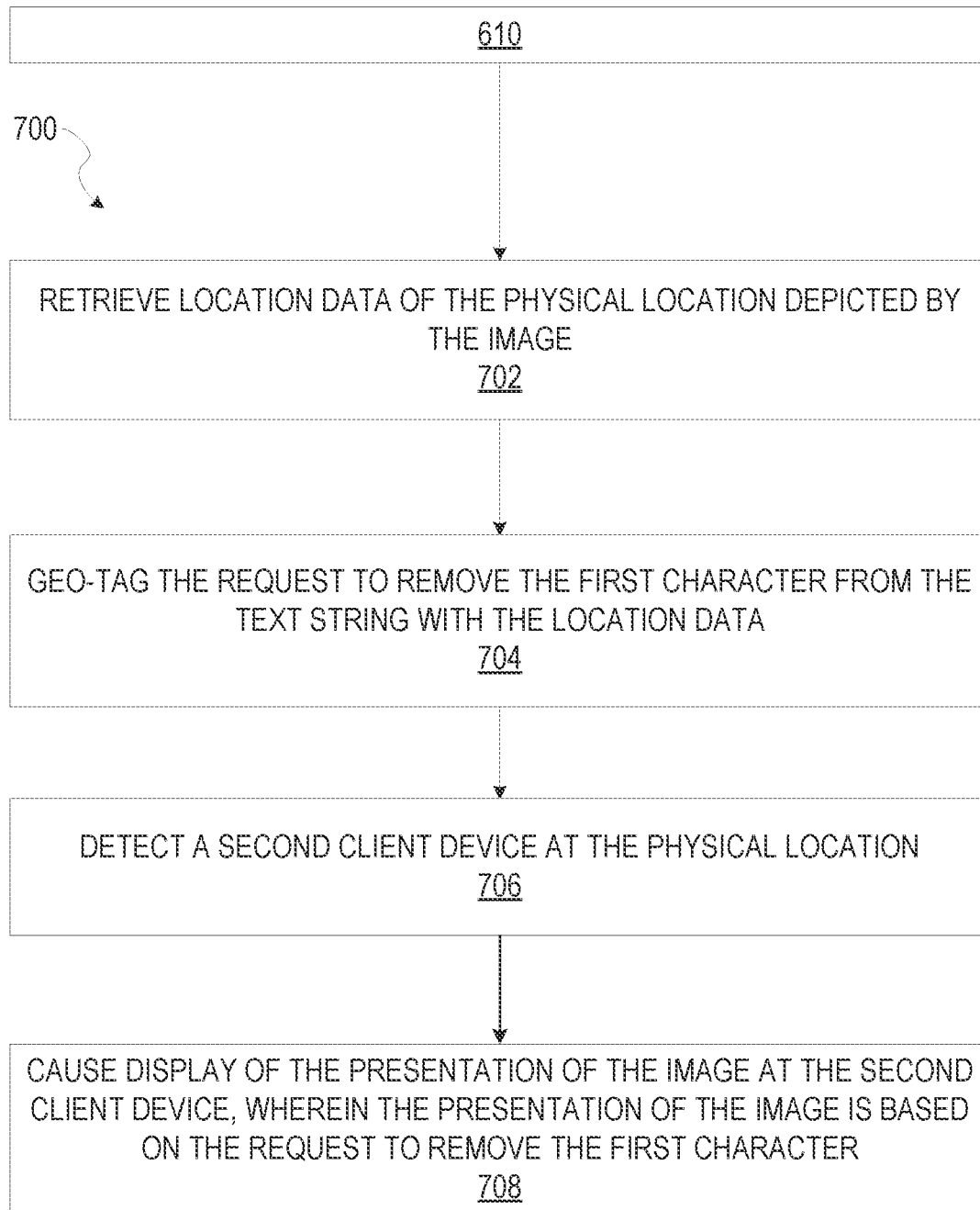
FIG. 7 is a flowchart illustrating various operations of the typography personalization system in performing a method of altering a presentation of an occurrence of typography at a client device based on a personalization request, according to certain example embodiments.

FIG. 7 is a diagram illustrating various operations of the typography personalization system 124 in performing a method 700 for altering a presentation of an occurrence of typography at a client device based on a personalization request, according to certain example embodiments. Operations of the method 700 may be performed by the modules described above with respect to FIG. 5. As shown in FIG. 7, the method 700 includes one or more operations 702, 704, 706, and 708 that may be performed as part (e.g., a precursor task, a subroutine, or a portion) of the method 600, according to some example embodiments.

Operation 702 may be performed by the identification module 504. At operation 702, the identification module 504 retrieves location data of the physical location depicted by the image. For example, the identification module 504 may retrieve geolocation coordinates from the client device 102 in response to causing display of the image within the presentation at the client device 102. In some example embodiments, the identification module 504 may parse image data of the image to retrieve image metadata indicating a location in which the image was captured.

Operations 704 may be performed by the presentation module 502. At operation 704, the presentation module 502 geo-tags the personalization request received at operation 608 of FIG. 6 with the geolocation coordinates of the location depicted in the image. For example, by geo-tagging the personalization request, the typography personalization system 124 may apply the personalization request received from the client device 102 (e.g., a first client device) to presentations of images that include the occurrence of typography and location data indicating the location at other client devices (e.g., a second client device).

At operation 706, the identification module 504 detects a second client device at the physical location. For example, the typography personalization system 124 may generate and maintain a geofence that encompasses the location identified by the location data of the image, in response to geotagging the image with the personalization request. A geofence is a virtual geographic boundary, defined by Global Positioning Systems (GPS), WiFi, Radio-Frequency Identification (RFID), or Cellular systems, that enables systems to trigger a response when a device is detecting in proximity with, or transgressing a boundary of the geofence. A second client device may transgress a boundary of a geofence that encompasses the location and in response the identification module 504 may identify the second client device. In further embodiments, the presentation module 502 may receive an indication that the second client device has captured an image depicting the location to generate and cause display of a presentation of the image at the second client device.

In some example embodiments, the identification module 504 accesses a user profile associated with a user of the second client device to retrieve user profile data, in response to detecting the second client device at the physical location. For example, the user profile of the user may include user profile information including a name and username, as well as demographics details and other associated user profile information (e.g., "likes," purchase behavior, a friend list, etc.).

Operation 708 may be performed by the presentation module 502. At operation 708, the presentation module 502 personalizes the presentation of the image captured by the second client device in response to detecting the second client device at the location. For example, the image may include the occurrence of typography referenced by the personalization request. In response to detecting the second client device at the location, and causing display of the presentation of the image, the presentation module 502 may personalize the occurrence of typography within the presentation based on the personalization request.

In some example embodiments, the presentation module 502 may personalize the presentation of the image based on the user profile data of the user associated with the client device. For example, the presentation module 502 may replace a text string in the image with a new text string based on user profile data of the user, such as a name of the user.

In some example embodiments, the personalization request may include access or viewing credentials that include user authorization criteria. For example, the personalization request may include a set of user identifiers, such that the typography personalization system 124 only personalizes presentation of an occurrence of typography based on the personalization request of users identified by the user identifiers in the personalization request.

Figure 8A:
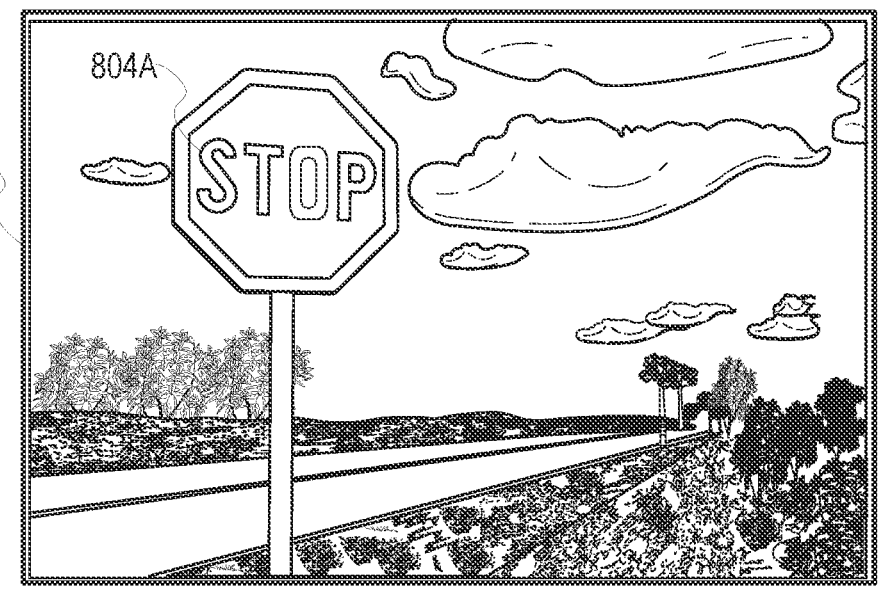
FIGS. 8A/B are representations of images depicting an occurrence of typography, with and without personalization, according to certain example embodiments.

FIG. 8A is a representation 800A of an image 802 that includes a depiction of an occurrence of typography 804A, according to certain example embodiments. As discussed in FIG. 6, a user of a client device 102 may capture the image 802, and the identification module 504 identifies the occurrence of typography 804A. The image 802 may include metadata such as geolocation coordinates, temporal components (e.g., a timestamp), as well as an identifier of a source of the image (e.g., client device 102).

As discussed in operation 604 of FIG. 6, the presentation module 502 causes display of a presentation of the image 802. The presentation of the image 802 may be displayed within a graphical user interface presented at the client device 102. The image 802 may depict a physical location (e.g., a road with a sign), wherein the physical location includes one or more occurrences of typography (e.g., the occurrence of typography 804A).

Figure 8B:
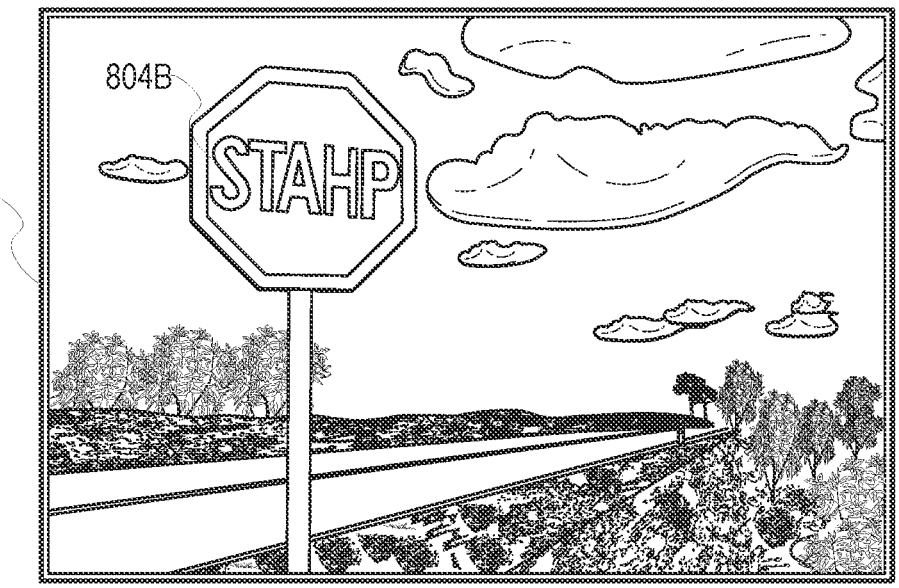

FIG. 8B is a representation 800B of the image 802, that includes a personalized occurrence of typography 804B, according to certain example embodiments. Operations 608 and 610 may be performed by the presentation module 502. As discussed in FIG. 6, the presentation module 502 receives a personalization request to alter or edit elements within the image 802 including the occurrence of typograph 804A. For example, the personalization request may include a request to alter one or more characters in the occurrence of typography 804A (e.g., change the "O" in stop to an "AH"). In response to receiving the request, the feature tracking module 506 generates and causes display of a text field to receive changes (e.g., deletions and additions) to the occurrence of typography 804A, and the presentation module 502 updates the presentation of the occurrence of typography 804A to display the personalized occurrence of typography 804B, based on the personalization request. As the user of the client device 102 changes perspectives, the feature tracking module 506 maintains the relative position of the personalized occurrence of typography 804B based on one or more features tracked by the feature tracking module 506.

In some example embodiments, the personalization request from the user may include a request to change a color or pattern of the stop sign depicted in the image 802. For example, the user may select the stop sign in the image 802, and in response, the identification module 504 may identify boundaries of the stop sign based on features of the image 802 in response to receiving the selection of the stop sign. For example, the identification module 504 may apply feature identification techniques to determine boundaries of the stop sign based on contrasting colors, or changes in pattern or texture. Upon detecting the boundaries of the stop sign, the typography personalization system 124 may prompt the user to specify a color or pattern in which to add to the stop sign. The user may thereby specify a new color (e.g., green), or in some embodiments, may select an image or pattern from a data repository, which the presentation module 502 may thereby apply to the background of the stop sign of the image 802.

Figure 9A:
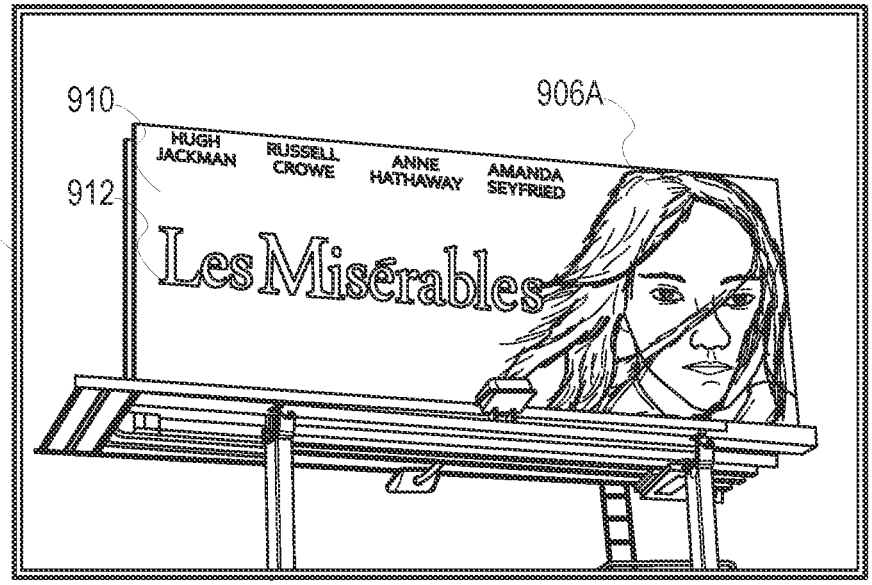
FIGS. 9A/B are representations of images depicting an occurrence of typography, with and without personalization, according to certain example embodiments.

FIG. 9A is a representation 900A of an image 902 that includes features such as an occurrence of typography 912, a background 910, and an image of a face 906A, according to certain example embodiments. As discussed in FIG. 6, a user of a client device 102 may capture the image 902, and the identification module 504 identifies the one or more features of the image 902 based on image recognition techniques. The image 902 may additionally include metadata such as geolocation coordinates, temporal components (e.g., a timestamp), as well as an identifier of a source of the image (e.g., client device 102).

As discussed in operation 604 of FIG. 6, the presentation module 502 causes display of a presentation of the image 902 at a client device 102. The presentation of the image 902 may be displayed within a graphical user interface presented at the client device 102. The image 902 may depict a physical location (e.g., a billboard).

Figure 9B:
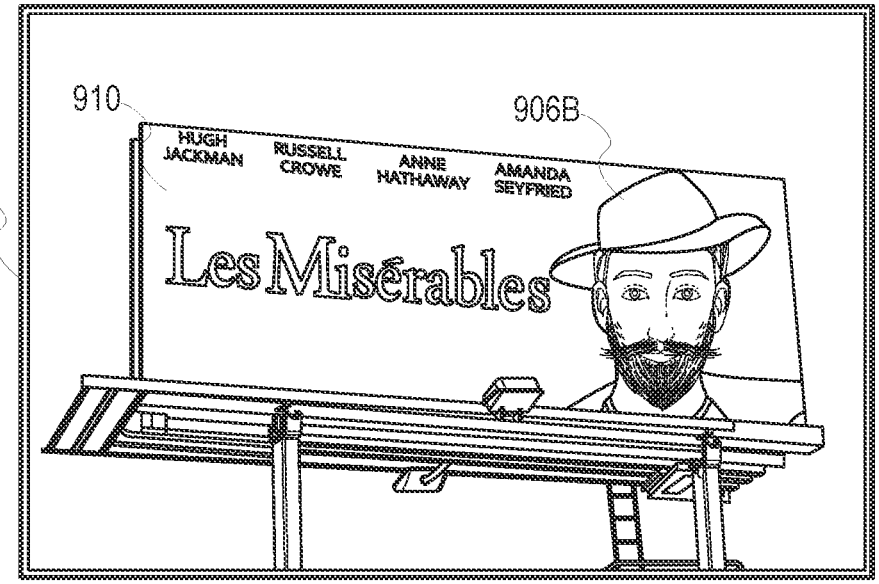

FIG. 9B is a representation 900B of the image 902, personalized based on a personalization request received from a user of the client device 102. As discussed in FIG. 6, the presentation module 502 receives a personalization request to alter or edit elements within the image 902 including features such as the background 910. For example, the personalization request may include a request to change the background 910 from a first color to a second color (e.g., from red to green), or to replace the background 910 with a pattern retrieved from a repository associated with the client device 102. For example, in response to selecting the background 910 of the image 902, the personalization system 124 may prompt the user to select a color or pattern to replace the background 910. The user may thereby select a color or pattern from among a selection of colors and patterns, retrieved from a database (e.g., database 120).

In some example embodiments, the personalization request may include a request to "face-swap" the face 906A of FIG. 9A to a face 906B, as depicted in FIG. 9B. For example, in response to receiving a selection of the face 906A of FIG. 9A, the identification module 504 may determine that 906A is a depiction of a face, and in response prompt the user to select another face from among a selection of faces to face-swap. The selection of faces may be retrieved from a database 120, wherein the database 120 may be populated with images captured by the user on the client device 102, or in some example embodiments may include faces retrieved from a third party network. The user may select a face e.g., 906B), and in response, the presentation module 502 may cause display of the face 906B in the location of the face 906A.

Software Architecture

Figure 10:
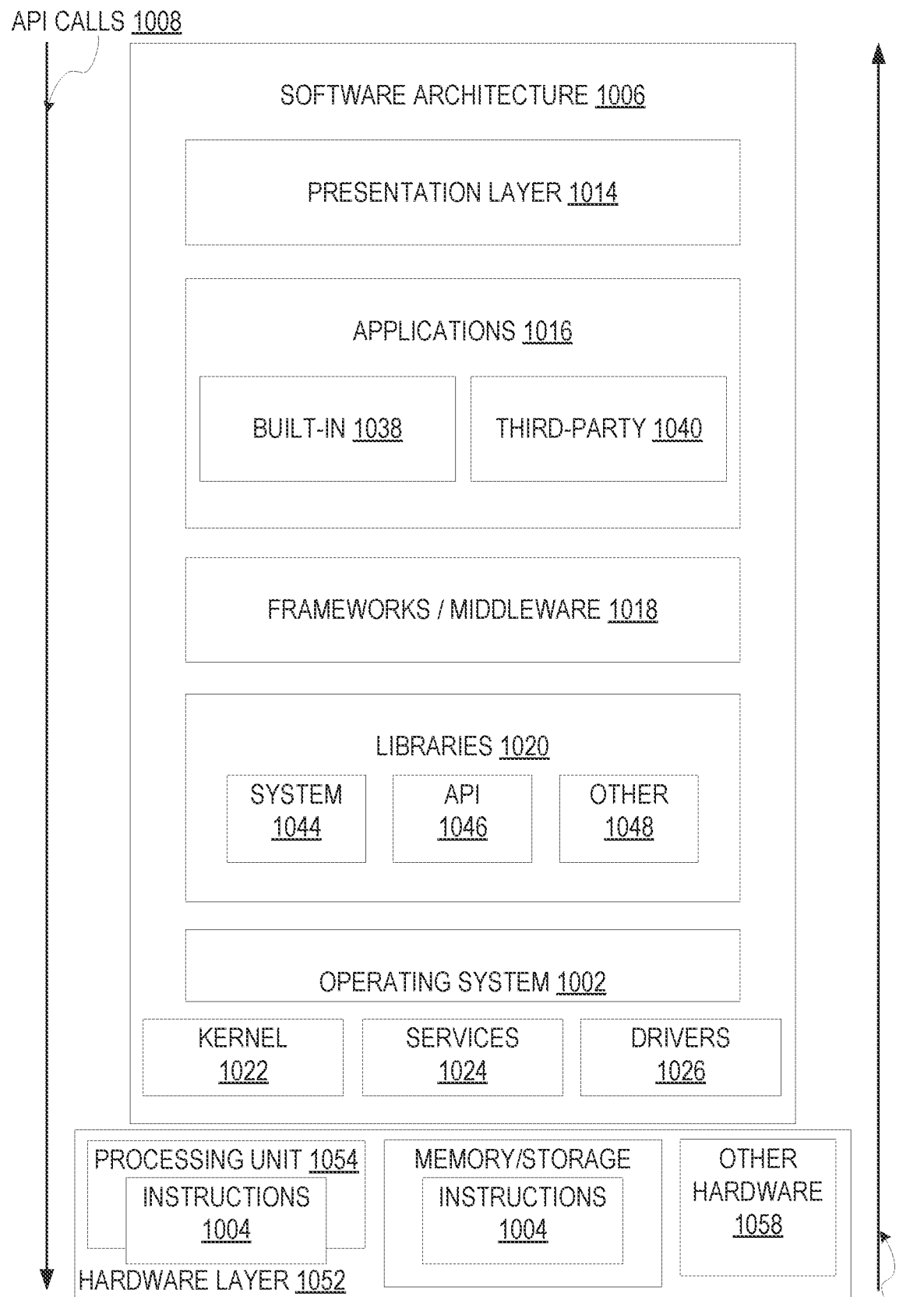
FIG. 10 is a block diagram illustrating a representative software architecture, which may be used in conjunction with various hardware architectures herein described and used to implement various embodiments.

FIG. 10 is a block diagram illustrating an example software architecture 1006, which may be used in conjunction with various hardware architectures herein described. FIG. 10 is a non-limiting example of a software architecture and it will be appreciated that many other architectures may be implemented to facilitate the functionality described herein. The software architecture 1006 may execute on hardware such as machine 1000 of FIG. 10 that includes, among other things, processors 1004, memory 1014, and I/O components 1018. A representative hardware layer 1052 is illustrated and can represent, for example, the machine 1000 of FIG. 10. The representative hardware layer 1052 includes a processing unit 1054 having associated executable instructions 1004. Executable instructions 1004 represent the executable instructions of the software architecture 1006, including implementation of the methods, components and so forth described herein. The hardware layer 1052 also includes memory and/or storage modules memory/storage 1056, which also have executable instructions 1004. The hardware layer 1052 may also comprise other hardware 1058.

In the example architecture of FIG. 10, the software architecture 1006 may be conceptualized as a stack of layers where each layer provides particular functionality. For example, the software architecture 1006 may include layers such as an operating system 1002, libraries 1020, applications 1016 and a presentation layer 1014. Operationally, the applications 1016 and/or other components within the layers may invoke application programming interface (API) API calls 1008 through the software stack and receive a response as in response to the API calls 1008. The layers illustrated are representative in nature and not all software architectures have all layers. For example, some mobile or special purpose operating systems may not provide a frameworks/middleware 1018, while others may provide such a layer. Other software architectures may include additional or different layers.

The operating system 1002 may manage hardware resources and provide common services. The operating system 1002 may include, for example, a kernel 1022, services 1024 and drivers 1026. The kernel 1022 may act as an abstraction layer between the hardware and the other software layers. For example, the kernel 1022 may be responsible for memory management, processor management (e.g., scheduling), component management, networking, security settings, and so on. The services 1024 may provide other common services for the other software layers. The drivers 1026 are responsible for controlling or interfacing with the underlying hardware. For instance, the drivers 1026 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1020 provide a common infrastructure that is used by the applications 1016 and/or other components and/or layers. The libraries 1020 provide functionality that allows other software components to perform tasks in an easier fashion than to interface directly with the underlying operating system 1002 functionality (e.g., kernel 1022, services 1024 and/or drivers 1026). The libraries 1020 may include system libraries 1044 (e.g., C standard library) that may provide functions such as memory allocation functions, string manipulation functions, mathematical functions, and the like. In addition, the libraries 1020 may include API libraries 1046 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1020 may also include a wide variety of other libraries 1048 to provide many other APIs to the applications 1016 and other software components/modules.

The frameworks/middleware 1018 (also sometimes referred to as middleware) provide a higher-level common infrastructure that may be used by the applications 1016 and/or other software components/modules. For example, the frameworks/middleware 1018 may provide various graphic user interface (GUI) functions, high-level resource management, high-level location services, and so forth. The frameworks/middleware 1018 may provide a broad spectrum of other APIs that may be utilized by the applications 1016 and/or other software components/modules, some of which may be specific to a particular operating system 1002 or platform.

The applications 1016 include built-in applications 1038 and/or third-party applications 1040. Examples of representative built-in applications 1038 may include, but are not limited to, a contacts application, a browser application, a book reader application, a location application, a media application, a messaging application, and/or a game application. Third-party applications 1040 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1040 may invoke the API calls 1008 provided by the mobile operating system (such as operating system 1002) to facilitate functionality described herein.

The applications 1016 may use built in operating system functions (e.g., kernel 1022, services 1024 and/or drivers 1026), libraries 1020, and frameworks/middleware 1018 to create user interfaces to interact with users of the system. Alternatively, or additionally, in some systems interactions with a user may occur through a presentation layer, such as presentation layer 1014. In these systems, the application/component "logic" can be separated from the aspects of the application/component that interact with a user.

Figure 11:
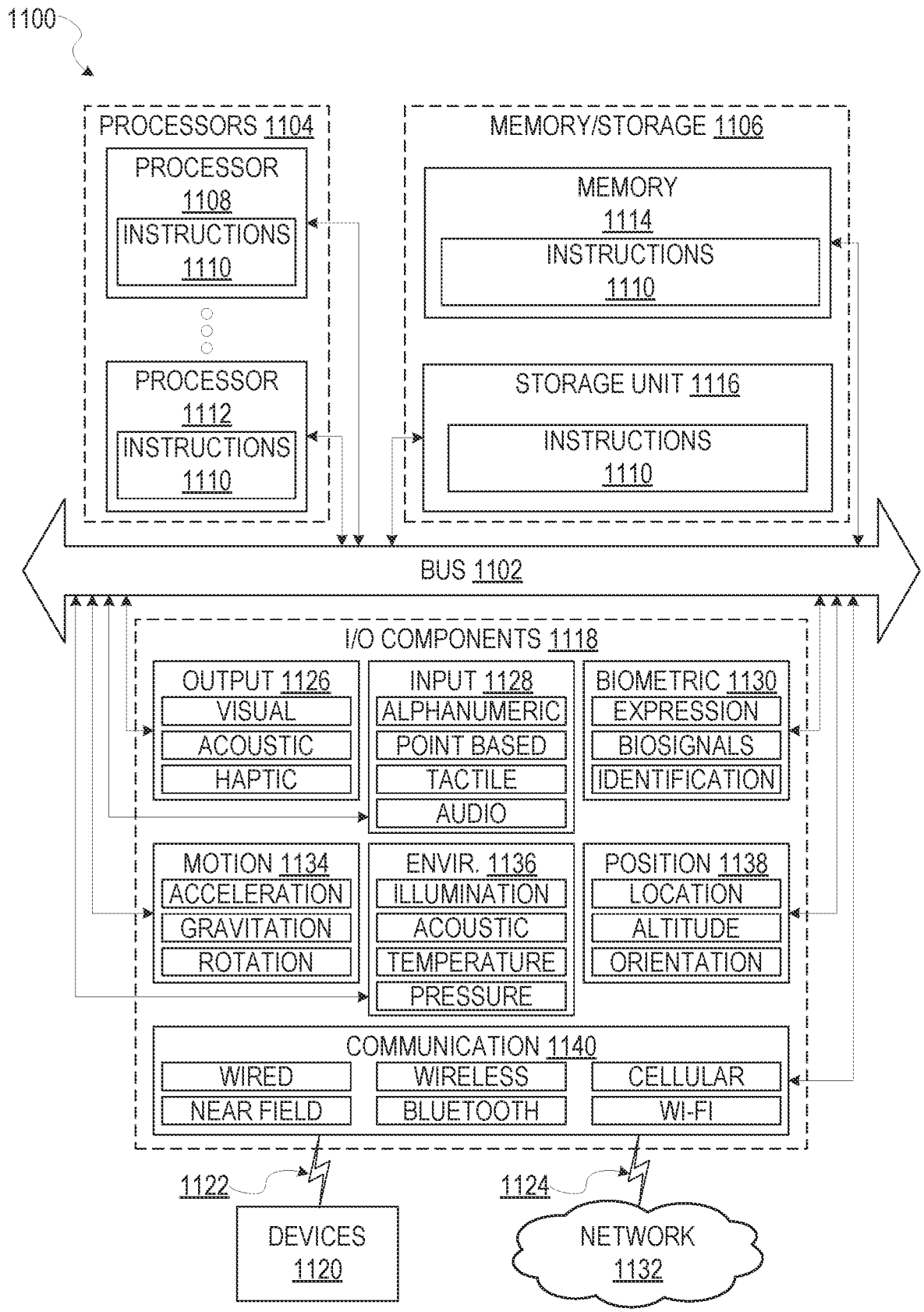
FIG. 11 is a block diagram illustrating components of a machine, according to some example embodiments, able to read instructions from a machine-readable medium (e.g., a machine-readable storage medium) and perform any one or more of the methodologies discussed herein.

FIG. 11 is a block diagram illustrating components of a machine 1100, according to some example embodiments, able to read instructions from a machine-readable medium (e.g., a machine-readable storage medium) and perform any one or more of the methodologies discussed herein. Specifically, FIG. 11 shows a diagrammatic representation of the machine 1100 in the example form of a computer system, within which instructions 1110 (e.g., software, a program, an application, an applet, an app, or other executable code) for causing the machine 1100 to perform any one or more of the methodologies discussed herein may be executed. As such, the instructions 1110 may be used to implement modules or components described herein. The instructions 1110 transform the general, non-programmed machine 1100 into a particular machine 1100 programmed to carry out the described and illustrated functions in the manner described. In alternative embodiments, the machine 1100 operates as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1110, sequentially or otherwise, that specify actions to be taken by machine 1100. Further, while only a single machine 1100 is illustrated, the term "machine" shall also be taken to include a collection of machines that individually or jointly execute the instructions 1110 to perform any one or more of the methodologies discussed herein.

The machine 1100 may include processors 1104, memory memory/storage 1106, and I/O components 1118, which may be configured to communicate with each other such as via a bus 1102. The memory/storage 1106 may include a memory 1114, such as a main memory, or other memory storage, and a storage unit 1116, both accessible to the processors 1104 such as via the bus 1102. The storage unit 1116 and memory 1114 store the instructions 1110 embodying any one or more of the methodologies or functions described herein. The instructions 1110 may also reside, completely or partially, within the memory 1114, within the storage unit 1116, within at least one of the processors 1104 (e.g., within the processor's cache memory), or any suitable combination thereof, during execution thereof by the machine 1100. Accordingly, the memory 1114, the storage unit 1116, and the memory of processors 1104 are examples of machine-readable media.

The I/O components 1118 may include a wide variety of components to receive input, provide output, produce output, transmit information, exchange information, capture measurements, and so on. The specific I/O components 1118 that are included in a particular machine 1100 will depend on the type of machine. For example, portable machines such as mobile phones will likely include a touch input device or other such input mechanisms, while a headless server machine will likely not include such a touch input device. It will be appreciated that the I/O components 1118 may include many other components that are not shown in FIG. 11. The I/O components 1118 are grouped according to functionality merely for simplifying the following discussion and the grouping is in no way limiting. In various example embodiments, the I/O components 1118 may include output components 1126 and input components 1128. The output components 1126 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1128 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1118 may include biometric components 1130, motion components 1134, environmental environment components 1136, or position components 1138 among a wide array of other components. For example, the biometric components 1130 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1134 may include acceleration sensor components (e.g., accelerometer), gravitation sensor components, rotation sensor components (e.g., gyroscope), and so forth. The environment components 1136 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1138 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1118 may include communication components 1140 operable to couple the machine 1100 to a network 1132 or devices 1120 via coupling 1122 and coupling 1124 respectively. For example, the communication components 1140 may include a network interface component or other suitable device to interface with the network 1132. In further examples, communication components 1140 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1120 may be another machine or any of a wide variety of peripheral devices (e.g., a peripheral device coupled via a Universal Serial Bus (USB)).

Moreover, the communication components 1140 may detect identifiers or include components operable to detect identifiers. For example, the communication components 1140 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1140, such as, location via Internet Protocol (IP) geo-location, location via Wi-Fi® signal triangulation, location via detecting a NFC beacon signal that may indicate a particular location, and so forth.

Glossary

"ANAMORPHOSIS" in this context refers to distortions and transformations applied to a media items such as images and videos, such that the media items appear normal when viewed from a particular point or through a suitable viewing device, mirror, or lens.

"PERSPECTIVE" in this context refers to a viewing angle of a user at a particular location.

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EMPHEMERAL MESSAGE" in this context refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

What is claimed is:

1. A method comprising:
    causing display of a presentation of an image at a client device, the image comprising a display of typography;
    detecting the display of the typography at a position within the image, the typography comprising typographical properties that include a sequence of characters;
    displaying a text input field over the display of the typography at the client device;
    receiving edits to the typography via the text input field, the edits comprising at least a change in the sequence of characters associated with the typography;
    identifying a distortion of the typography based on the typographical properties of the typography;
    determining a shape of a surface based on the distortion of the typography;
    generating augmented reality content based on the typographical properties of the typography and the sequence of characters of the edits; and
    causing display of the augmented reality content at the client device based on the shape of the surface.

2. The method of claim 1, wherein the typographical properties of the typography includes one or more of:
    a typeface of the typography;
    a size of the typography;
    a color of the typography; and
    a weight of the typography.

3. The method of claim 1, wherein the method further comprises:
    identifying a background of the display of the typography; and
    generating the augmented reality content based on the typographical properties of the typography, the sequence of characters of the edits, and the background of the display of the typography.

4. The method of claim 3, wherein the background comprises a pattern.

5. The method of claim 1, wherein the displaying the text input field further comprises:
    receiving a selection of the display of the typography from the client device; and
    displaying the text input field in response to the selection of the display of the typography.

6. The method of claim 1, wherein the identifying of the distortion of the typography comprises:
    performing a comparison of the typography against a catalogue of characters based on the typographical properties of the typography.

7. The method of claim 1, wherein the client device corresponds with a user profile, and the generating the augmented reality content further comprises:
    accessing credentials associated with the user profile; and
    generating the augmented reality content based on the typographical properties of the typography and the sequence of characters of the edits based on the credentials associated with the user profile.

8. A system comprising:
    a memory; and
    at least one hardware processor coupled to the memory and comprising instructions that cause the system to perform operations comprising:
    causing display of a presentation of an image at a client device, the image comprising a display of typography;
    detecting the display of the typography at a position within the image, the typography comprising typographical properties that include a sequence of characters;
    displaying a text input field over the display of the typography at the client device;

receiving edits to the typography via the text input field, the edits comprising at least a change in the sequence of characters associated with the typography;

identifying a distortion of the typography based on the typographical properties of the typography;

determining a shape of a surface based on the distortion of the typography;

generating augmented reality content based on the typographical properties of the typography and the sequence of characters of the edits; and causing display of the augmented reality content at the client device based on the shape of the surface.

9. The system of claim 8, wherein the typographical properties of the typography includes one or more of:
a typeface of the typography;
a size of the typography;
a color of the typography; and
a weight of the typography.

10. The system of claim 8, wherein the operations further comprise:
identifying a background of the display of the typography; and
generating the augmented reality content based on the typographical properties of the typography, the sequence of characters of the edits, and the background of the display of the typography.

11. The system of claim 10, wherein the background comprises a pattern.

12. The system of claim 8, wherein the displaying the text input field further comprises:
receiving a selection of the display of the typography from the client device; and
displaying the text input field in response to the selection of the display of the typography.

13. The system of claim 8, wherein the identifying of the distortion of the typography comprises:
performing a comparison of the typography against a catalogue of characters based on the typographical properties of the typography.

14. The system of claim 8, wherein the client device corresponds with a user profile, and the generating the augmented reality content further comprises:
accessing credentials associated with the user profile; and
generating the augmented reality content based on the typographical properties of the typography and the sequence of characters of the edits based on the credentials associated with the user profile.

15. A non-transitory machine-readable storage medium comprising instructions that, when executed by one or more processors of a machine, cause the machine to perform operations including:

causing display of a presentation of an image at a client device, the image comprising a display of typography;

detecting the display of the typography at a position within the image, the typography comprising typographical properties that include a sequence of characters;

displaying a text input field over the display of the typography at the client device;

receiving edits to the typography via the text input field, the edits comprising at least a change in the sequence of characters associated with the typography;

identifying a distortion of the typography based on the typographical properties of the typography;

determining a shape of a surface based on the distortion of the typography;

generating augmented reality content based on the typographical properties of the typography and the sequence of characters of the edits; and causing display of the augmented reality content at the client device based on the shape of the surface.

16. The non-transitory machine-readable storage medium of claim 15, wherein the typographical properties of the typography includes one or more of:
a typeface of the typography;
a size of the typography;
a color of the typography; and
a weight of the typography.

17. The non-transitory machine-readable storage medium of claim 15, wherein the operations further comprise:
identifying a background of the display of the typography; and
generating the augmented reality content based on the typographical properties of the typography, the sequence of characters of the edits, and the background of the display of the typography.

18. The non-transitory machine-readable storage medium of claim 17, wherein the background comprises a pattern.

19. The non-transitory machine-readable storage medium of claim 15, wherein the displaying the text input field further comprises:
receiving a selection of the display of the typography from the client device; and
displaying the text input field in response to the selection of the display of the typography.

20. The non-transitory machine-readable storage medium of claim 15, wherein the identifying of the distortion of the typography comprises:
performing a comparison of the typography against a catalogue of characters based on the typographical properties of the typography.

* * * * *